(12) United States Patent
Kim et al.

(10) Patent No.: US 12,548,775 B2
(45) Date of Patent: Feb. 10, 2026

(54) ANODE MATERIAL FOR ALL-SOLID SECONDARY BATTERY, ANODE LAYER AND ALL-SOLID SECONDARY BATTERY INCLUDING THE SAME, AND MANUFACTURING METHOD THEREOF

(71) Applicant: SAMSUNG SDI CO., LTD., Yongin-si (KR)

(72) Inventors: Jinkyu Kim, Yongin-si (KR); Jinhoon Yang, Yongin-si (KR); Byeonggyu Cho, Yongin-si (KR); Yunchae Jung, Yongin-si (KR); Yoonchang Kim, Yongin-si (KR); Sangil Han, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 608 days.

(21) Appl. No.: 17/554,635

(22) Filed: Dec. 17, 2021

(65) Prior Publication Data
US 2022/0199995 A1    Jun. 23, 2022

(30) Foreign Application Priority Data

Dec. 21, 2020 (KR) .................. 10-2020-0179921
Nov. 17, 2021 (KR) .................. 10-2021-0158712

(51) Int. Cl.
*H01M 4/587* (2010.01)
*H01M 4/36* (2006.01)
*H01M 10/0562* (2010.01)

(52) U.S. Cl.
CPC .......... *H01M 4/587* (2013.01); *H01M 4/362* (2013.01); *H01M 10/0562* (2013.01); *H01M 2300/008* (2013.01)

(58) Field of Classification Search
CPC .... H01M 4/587; H01M 4/134; H01M 4/0471; H01M 4/133; H01M 4/1393;
(Continued)

(56) References Cited

U.S. PATENT DOCUMENTS 9,692,049 B2 * 6/2017 Hwang ............... H01M 4/0404
2017/0054144 A1 * 2/2017 Li .................... H01M 10/0525
(Continued)

FOREIGN PATENT DOCUMENTS

CN      111129424 A    5/2020
EP      3869584 A1     8/2021
(Continued)

OTHER PUBLICATIONS

English Translation of KR20070120734A-KNU industry cooperation found.; Dec. 26, 2007 (Year: 2007).*
(Continued)

*Primary Examiner* — Matthew T Martin
*Assistant Examiner* — Adam J Francis
(74) *Attorney, Agent, or Firm* — Lee IP Law, P.C.

(57) ABSTRACT

An anode material, an anode layer including the same, an all-solid secondary battery including the anode layer, and a method of manufacturing the all-solid secondary battery, the anode material including a metal-carbon composite, wherein the metal-carbon composite includes a carbon material; and metal particles, and the metal particles are dispersed and complexed in the carbon material, between particles of the carbon material, on a surface of the carbon material, or in two or more locations thereof.

18 Claims, 23 Drawing Sheets

(58) Field of Classification Search
CPC ........ H01M 4/362; H01M 4/583; H01M 4/54; H01M 4/38; H01M 10/0562; H01M 10/052; H01M 2300/008; H01M 2004/027
See application file for complete search history.

(56) References Cited

U.S. PATENT DOCUMENTS

| | | | |
|---|---|---|---|
| 2019/0051904 A1* | 2/2019 | Zhamu | H01M 10/058 |
| 2020/0136178 A1 | 4/2020 | Ku et al. | |
| 2020/0144575 A1 | 5/2020 | Ku et al. | |
| 2020/0358098 A1* | 11/2020 | Kim | C08F 120/18 |
| 2020/0373609 A1† | 11/2020 | Yashiro | |
| 2021/0005927 A1* | 1/2021 | Hoffert | H01M 4/0435 |
| 2021/0184218 A1* | 6/2021 | Ahn | H01M 4/583 |
| 2021/0257606 A1 | 8/2021 | Kim et al. | |
| 2022/0223837 A1 | 7/2022 | Kim et al. | |

FOREIGN PATENT DOCUMENTS

| | | | |
|---|---|---|---|
| EP | 3985757 A1 | 4/2022 | |
| JP | H11-329442 | 11/1999 | |
| JP | H-11329442 A | * 11/1999 | |
| JP | 2004-158208 A | 6/2004 | |
| JP | 2019-003785 A | 1/2019 | |
| JP | 6497282 B | 3/2019 | |
| KR | 20070120734 A | * 12/2007 | |
| KR | 2018-0035602 A | 4/2018 | |
| KR | 2019-0134537 A | 12/2019 | |
| KR | 2020-0050855 A | 5/2020 | |

OTHER PUBLICATIONS

Japanese Office action dated Jan. 16, 2023.
European Search Report dated May 17, 2022.
Chinese Office Action dated, Jan. 30, 2024, of the corresponding CN Patent Application No. 202111570333.4.
Korean Office action dated Oct. 15, 2024.
European Search Report dated Jan. 20, 2025.
Variava, Meherzad F., et al. "Polyol-assisted functionalization of carbon nanotubes—a perspective." Journal of materials chemistry A 1.30 (2013): 8509-8520.†

\* cited by examiner
† cited by third party

Metal-carbon composite

ANODE MATERIAL FOR ALL-SOLID SECONDARY BATTERY, ANODE LAYER AND ALL-SOLID SECONDARY BATTERY INCLUDING THE SAME, AND MANUFACTURING METHOD THEREOF

CROSS-REFERENCE TO RELATED APPLICATION

This application is based on and claims priority under 35 U.S.C. § 119 to Korean Patent Applications No. 10-2020-0179921, filed on Dec. 21, 2020 and No. 10-2021-0158712, filed on Nov. 17, 2021, in the Korean Intellectual Property Office, the disclosure of which is incorporated by reference herein in its entirety.

BACKGROUND

1. Field

Embodiments relate to an anode material, an anode layer including the same, an all-solid secondary battery including the anode layer, and a method of manufacturing the all-solid secondary battery.

2. Description of the Related Art

Recently, in response to industrial demands, batteries having high energy density and safety have been actively developed. For example, lithium-ion batteries may be used not only in the fields of information-related appliances and communication appliances, but also in the fields of automobiles. In the fields of automobiles, safety is especially important because it has an influence on life.

SUMMARY

The embodiments may be realized by providing an anode material for all-solid secondary batteries, the anode material comprising a metal-carbon composite, wherein the metal-carbon composite includes a carbon material; and metal particles, and the metal particles are dispersed and complexed in the carbon material, between particles of the carbon material, on a surface of the carbon material, or in two or more locations thereof.

The metal-carbon composite may have a metal-oxygen bond-related peak in a Raman spectrum.

In the Raman spectrum, the metal-oxygen bond-related peak may exist within Raman shift ranges of about 0 cm$^{-1}$ to about 250 cm$^{-1}$, about 400 cm$^{-1}$ to about 500 cm$^{-1}$, and about 900 cm$^{-1}$ to about 1,100 cm$^{-1}$, wherein the Raman spectrum is measured using a UV laser having a wavelength of about 514~516 nm.

In X-ray diffraction (XRD) analysis obtained using CuK α rays, the metal-carbon composite may have a 2theta value of at least one of about 35° to about 40°, about 40° to about 45°, about 60° to about 68°, about 75° to about 80°, and about 80° to about 85° in crystal peaks.

In a case of performing thermogravimetric analyses on randomly selected multiple sites of the same sample, in each thermogravimetric analysis of the metal-carbon composite, when a straight line connecting points of respective weight percentages (%) at a thermal decomposition temperature of 500° C. and a final temperature at which no further weight loss occurs is expressed by a linear equation represented by Equation 1 below, $$Y=-AX+B \qquad \text{<Equation 1>}$$

in Equation 1, X is a thermal decomposition temperature in ° C., Y is a weight loss rate, −A is a slope, and B is a y-intercept, and ΔA, which is a difference between values of A in each thermogravimetric analysis, is about 0.06 or less, and ΔB, which is a difference between values of B in each thermogravimetric analysis, is about 30 or less.

In each thermogravimetric analysis of the metal-carbon composite, a difference between the final temperature values is about 30° C. or lower.

The metal particles may include silver, zinc, silicon, tin, or a combination thereof.

The carbon material may include amorphous carbon, crystalline carbon, or a mixture thereof.

The amorphous carbon may include carbon black, vapor grown carbon fiber (VGCF), acetylene black (AB), active furnace black, or a combination thereof, and the crystalline carbon may include natural graphite, artificial graphite, carbon nanotubes (CNT), graphene, or a combination thereof.

The metal-carbon composite may include about 3 wt % to about 40 wt % of the metal particles, and 60 wt % to about 97 wt % of the carbon material, all wt % being based on a total weight of the carbon material and the metal particles.

The embodiments may be realized by providing an anode composition for all-solid secondary batteries, the anode composition including the anode material according to an embodiment; and an aqueous binder.

The embodiments may be realized by providing an anode layer for all-solid secondary batteries, the anode layer including an anode current collector and a first anode active material layer on the anode current collector, wherein the first anode active material layer includes the anode material according to an embodiment.

In a case of performing thermogravimetric analyses on randomly selected multiple sites of one anode layer, in each thermogravimetric analysis of the anode layer, when a straight line connecting points of respective weight percentages (%) at a thermal decomposition temperature of 500° C. and a final temperature at which no further weight loss occurs is expressed by a linear equation represented by Equation 2 below, $$Y=-A'X+B' \qquad \text{<Equation 2>}$$

in Equation 2 above, X is a thermal decomposition temperature in ° C., Y is a weight loss rate, −A' is a slope, and B' is a y-intercept, and ΔA', which is a difference between values of A' in each thermogravimetric analysis, is about 0.07 or less, and ΔB', which is a difference between values of B' in each thermogravimetric analysis, is about 50 or less.

The anode layer may further include a metal or metalloid thin film between the anode current collector and the first anode active material layer.

The metal or metalloid thin film may include gold (Au), silver (Ag), magnesium (Mg), zinc (Zn), silicon (Si), tin (Sn), platinum (Pt), palladium (Pd), aluminum (Al), bismuth (Bi), or a combination thereof, and the metal or metalloid thin film may have a thickness of about 1 nm to about 800 nm.

The anode layer may further include a second anode active material layer, the second anode active material layer including a metal element, a metalloid element, or a combination thereof, the metal element or metalloid element being capable of forming an alloy with lithium; and lithium or a lithium alloy.

The embodiments may be realized by providing an all-solid secondary battery including a cathode layer; an anode layer; and a solid electrolyte layer between the cathode layer and the anode layer, wherein the anode layer is the anode layer according to an embodiment.

The anode layer may further include a second anode active material layer on the first anode active material or between the anode current collector and the first anode active material layer, and the second anode active material layer may include lithium or a lithium alloy.

The solid electrolyte layer may include an argyrodite-type sulfide solid electrolyte.

The argyrodite-type sulfide solid electrolyte may include $Li_6PS_5Cl$, $Li_6PS_5Br$, or $Li_6PS_5I$.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
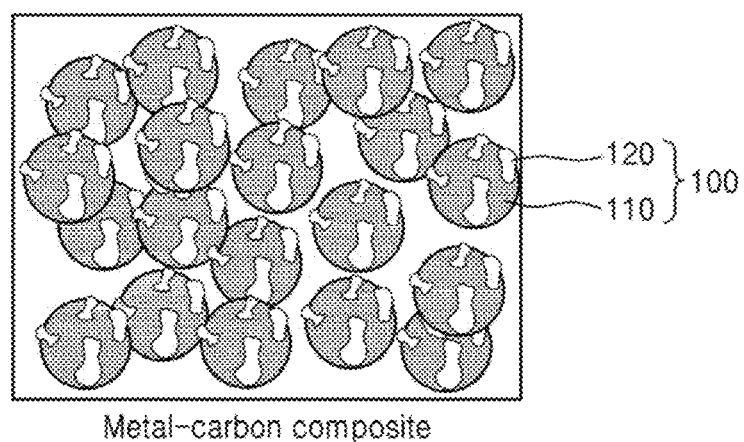
FIG. 1 schematically illustrates an anode material including a metal-carbon composite according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items, e.g., "A or B" would include A, B, or A and B. Expressions such as "at least one of," when preceding a list of elements, modify the entire list of elements and do not modify the individual elements of the list.

The terms used herein is for the purpose of describing particular embodiments only and is not intended to be limiting. Singular expressions include plural expressions unless the context clearly indicates otherwise. It will be further understood that the terms, "includes," "including," "comprises" and/or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Although the terms "first", "second", "third", etc., may be used herein to describe various elements, components, regions, and/or layers, these elements, components, regions, and/or layers should not be limited by these terms. These terms are used only to distinguish one component from another, not for purposes of limitation, and are not intended to imply sequential inclusion.

Hereinafter, an anode material, an anode layer including the same, an all-solid secondary battery including the anode layer, and a method of manufacturing the all-solid secondary battery will be described in more detail.

An anode layer for all-solid secondary batteries may include metal particles and carbon material. In order to make a current distribution in the anode layer uniform, the metal particles may be uniformly dispersed. The dispersion state of the anode material in the slurry may be improved, e.g., by improving a binder composition and a mixing method.

In the case of coating a slurry for forming an anode layer, the slurry being made of an anode composition containing metal particles and carbon material, aggregation of metal particles may occur.

According to an embodiment, an anode material for all-solid secondary batteries may be capable of addressing the above-described issues.

An anode material for all-solid secondary batteries according to an embodiment may include, e.g., a metal-carbon composite.

The metal-carbon composite may include, e.g., a carbon material; and metal particles. In an implementation, the metal particles may be dispersed and complexed in the carbon material, between particles of the carbon materials, on a surface of the carbon material, or in two or more locations thereof.

FIG. 1 schematically illustrates an anode material including a metal-carbon composite according to an embodiment.

As shown in FIG. 1, in the metal-carbon composite 100, the metal particles 120 may be dispersed in the carbon material 110, between particles of the carbon material 110, or on a surface of the carbon material 110, or may be dispersed in two or more locations thereof. In the anode material including such a metal-carbon composite 100, the metal particles 120 may be uniformly dispersed in the carbon material 110, so that aggregation of the metal particles 120 may be reduced or prevented.

In an implementation, when the anode material including the metal-carbon composite is used to form an anode layer of an all-solid secondary battery, the distribution of current in the anode layer may be uniform.

Figure 2:
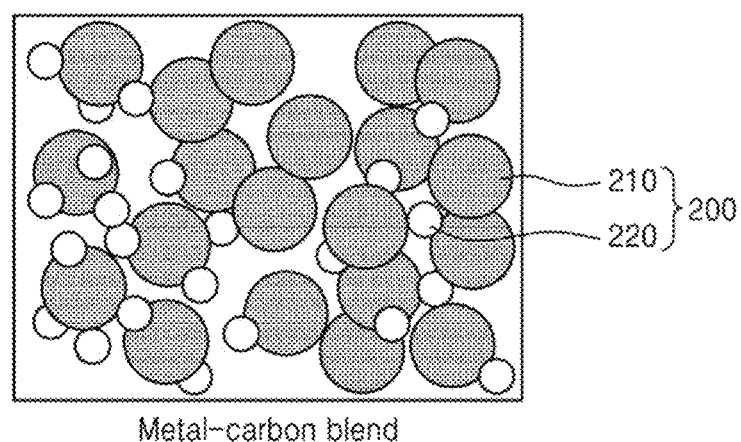
FIG. 2 schematically illustrates an anode material including a metal-carbon blend.

FIG. 2 schematically illustrates another anode material including a metal-carbon blend 200.

As shown in FIG. 2, unlike the anode material including the metal-carbon composite 100 according to an embodiment, in an anode material including a metal-carbon blend 200 of metal particles 220 and carbon material 210, it may be difficult to avoid the aggregation of metal particles 220.

In the anode material according to an embodiment, the carbon material may include, e.g., amorphous carbon, crystalline carbon, or a mixture thereof. The amorphous carbon may include, e.g., carbon black, vapor grown carbon fiber (VGCF), acetylene black (AB), active furnace black, or a combination thereof. The crystalline carbon may include, e.g., natural graphite, artificial graphite, carbon nanotubes (CNT), graphene, or a combination thereof. The crystalline carbon may be, e.g., amorphous, plate-like, flake-like, spherical, or fibrous.

The carbon material may be in the form of particles or powder. In an implementation, the carbon material may be nano-sized amorphous carbon particles having an average particle diameter of about 100 nm or less, e.g., about 10 nm to about 100 nm. Amorphous carbon particles, which are main materials remaining after processing crude oil and coal, are powders in a state in which a significant amount of organic materials have been removed through refining several times. The carbon material may include, e.g., amorphous carbon made using crude oil, natural gas, acetylene gas, or the like. In an implementation, the carbon material may include carbon black obtained by spraying and vaporizing crude oil, natural gas, acetylene gas, or the like at about 1,600° C. to about 2,000° C.

The metal particles may be dispersed and complexed in the carbon materials, between the carbon materials, on the surface of the carbon material, or in two or more locations thereof. In an implementation, the carbon material may be supported with a metal particle.

In the metal-carbon composite, the metal particle may include, e.g., silver, zinc, silicon, tin, or a combination thereof. In an implementation, in the metal-carbon composite, the metal particle may include, e.g., silver.

In the metal-carbon composite, based on a total weight of the carbon material and the metal particles, the content of the metal particles may be, e.g., about 3 wt % to about 40 wt %, and the content of the carbon material may be, e.g., about 60 wt % to about 97 wt %. In an implementation, based on the total weight of the carbon material and the metal particles, the content of the metal particles may be, e.g., about 3 wt % to about 35 wt %, about 3 wt % to about 30 wt %, about 4 wt % to about 25 wt %, about 5 wt % to about 25 wt %, about 5 wt % to about 20 wt %, or about 5 wt % to about 15 wt %. In an implementation, based on the total weight of the carbon material and the metal particles, the content of the carbon material may be, e.g., about 65 wt % to about 97 wt %, 70 wt % to about 97 wt %, 75 wt % to about 96 wt %, 75 wt % to about 95 wt %, 80 wt % to about 95 wt %, or 85 wt % to about 95 wt %. Within this range, the metal particles may be evenly dispersed and well complexed in the carbon material, between the carbon materials, on the surface of the carbon material, or in two or more locations thereof.

Figure 10:
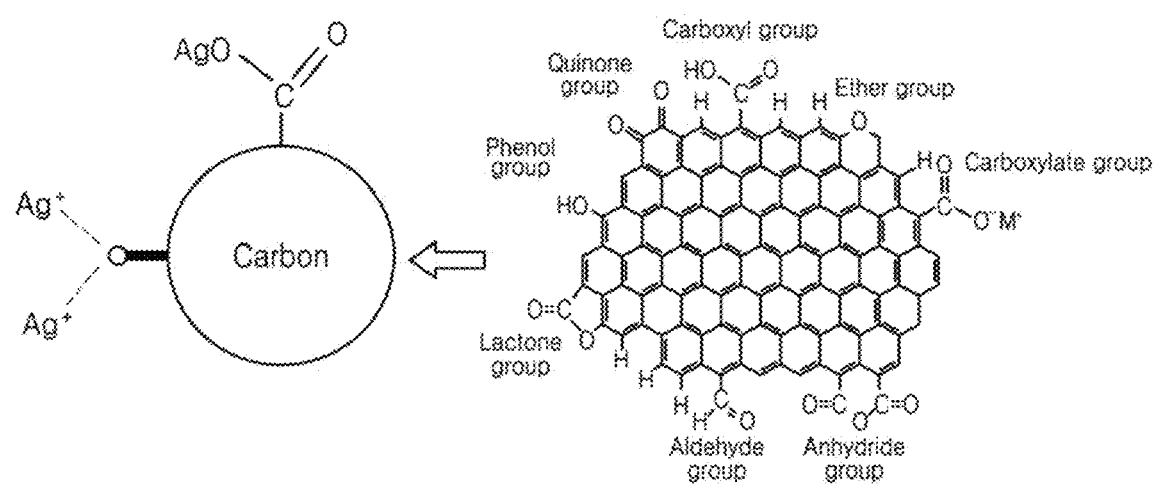
FIG. 10 is a schematic view of an Ag—O bond for explaining the Raman peak of the silver-carbon composite according to an embodiment.

As described above, in the metal-carbon composite in which a metal particle and a carbon material are complexed, a metal-oxygen (M-O) bond-related peak may exist in a Raman spectrum. In an implementation, in the Raman spectrum, the metal-oxygen (M-O) bond-related peak may exist within a Raman shift range of about 0 cm$^{-1}$ to about 250 cm$^{-1}$, about 400 cm$^{-1}$ to about 500 cm$^{-1}$, and about 900 cm$^{-1}$ to about 1,100 cm$^{-1}$. In an implementation, in the case of a silver-carbon composite in which silver (Ag) and carbon are bonded, a silver-oxygen (Ag—O) bond-related peak may appear at a Raman shift of about 200 cm$^{-1}$, about 470 cm$^{-1}$, or about 990 cm$^{-1}$. As shown in FIG. 10, various functional groups, e.g., a carbonyl group, an ether group, a carboxylate group, an anhydride group, an aldehyde group, a lactone group, a phenol group, or a quinone group may exist around carbon. Ag—O bond-related peaks may appear as functional groups around carbon and silver may be complexed through bonding such as ionic bonding or covalent bonding.

Figure 11:
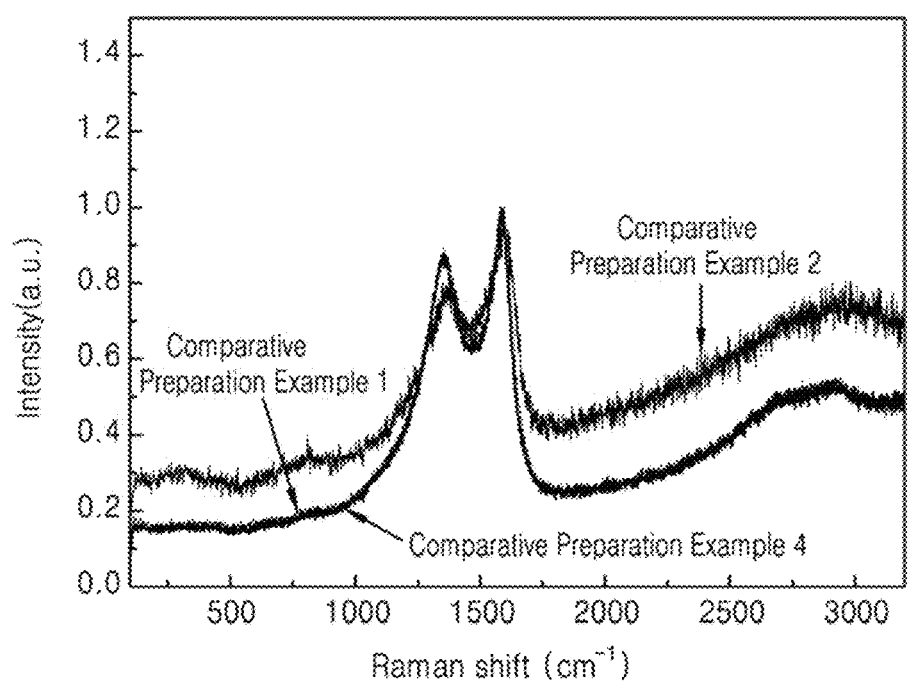
FIG. 11 illustrates the results of Raman analysis of silver-carbon blends prepared according to Comparative Preparation Examples 1 and 2 and carbon material not supported with silver prepared according to Comparative Preparation Example 4.
Figure 12:
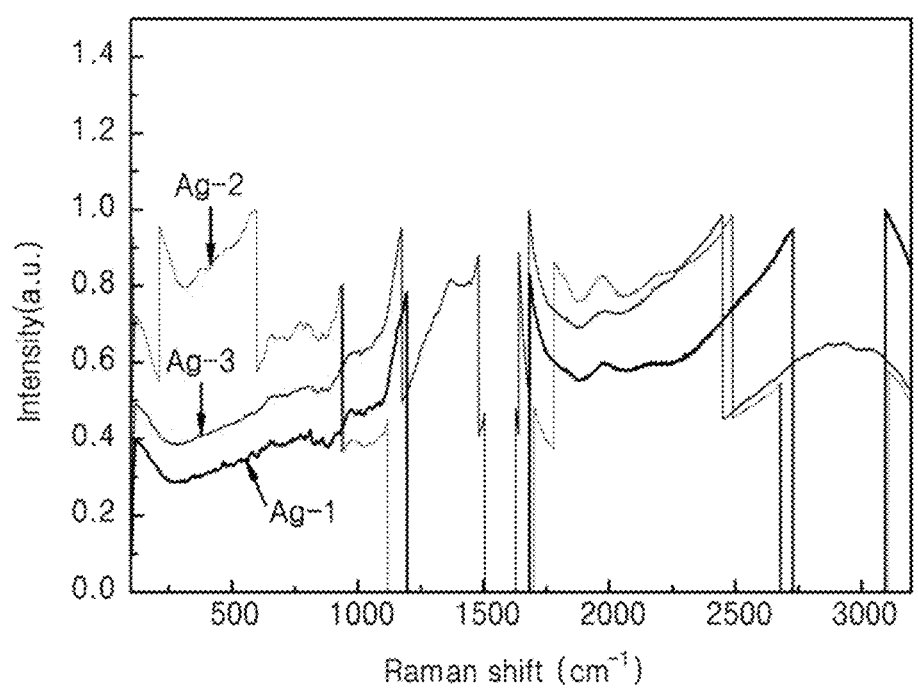
FIG. 12 illustrates the results of Raman analysis of Ag nanopowder.

In contrast, if the metal particles and the carbon material were simply blended, a bond may not be formed between the metal and carbon, so that such a metal-oxygen (M-O) bond-related peak may not appear in the Raman spectrum, e.g., as shown in FIG. 11. Meanwhile, in the case of metal particles such as silver nanopowder, there is no vibration due to a specific bond, so that it is difficult to perform Raman analysis as expected as shown in FIG. 12.

In X-ray diffraction (XRD) analysis, the metal-carbon composite in which the metal particles and the carbon material are complexed may have a 2theta value of at least one of about 35° to about 40°, about 40° to about 45°, about 60° to about 68°, about 75° to about 80°, and about 80° to about 85° in crystal peaks. In an implementation, in the XRD, the metal-carbon composite may have a 2theta value of, e.g., about 35.1°, about 44.3°, about 64.5°, about 77.5°, and about 81.33° in crystal peaks. This means that a peak of a metal crystal may be observed in the metal-carbon composite.

In an implementation, in the case of performing thermogravimetric analyses on randomly selected multiple sites of the same sample, in each thermogravimetric analysis of the metal-carbon composite, a straight line connecting points of respective weight percentages (%) at the thermal decomposition temperature of 500° C. and final temperature at which no further weight loss occurs is expressed by a linear equation represented by Equation 1 below.

$$Y=-AX+B \qquad \text{<Equation 1>}$$

In Equation 1, X is thermal decomposition temperature in ° C., Y is a weight loss rate, −A is a slope, and B is a y-intercept, and ΔA may be about 0.06 or less, and ΔB may be about 30 or less. Here, ΔA means a difference between the values of A, and ΔB means a difference between the values of B.

Figure 17:
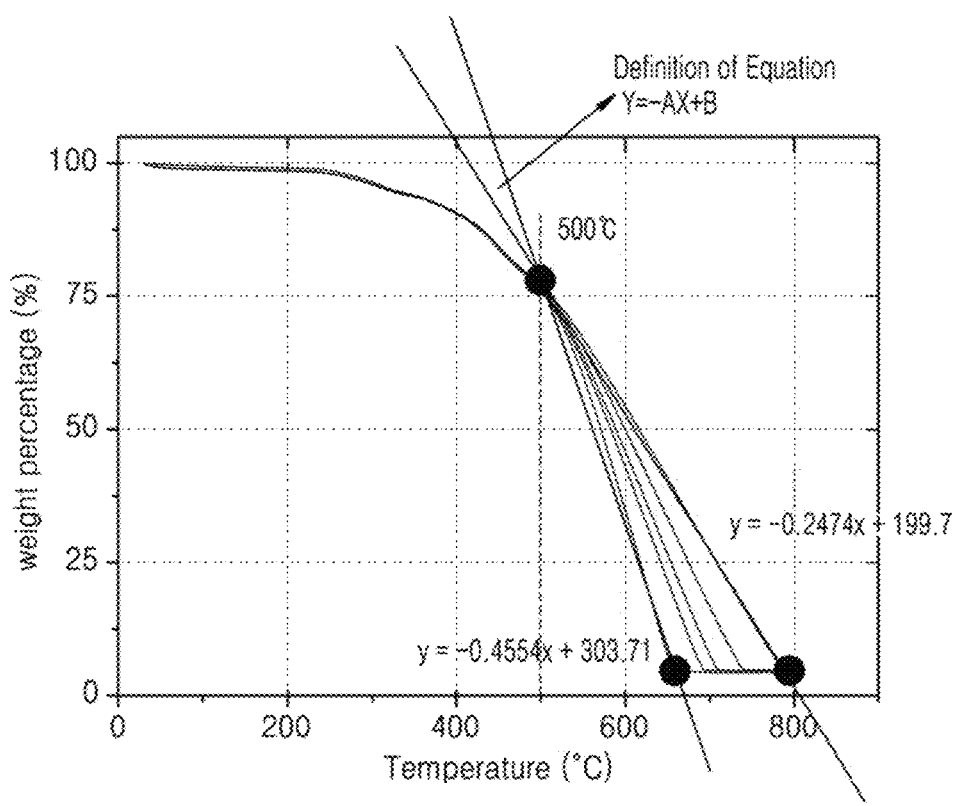
FIG. 17 is a view of a numerical change in the thermogravimetric analysis results.

In an implementation, as shown in FIG. 17, in the thermogravimetric analysis graph of the metal-carbon composite, the straight line connecting points of respective weight percentages (%) at the thermal decomposition temperature of 500° C. and final temperature may be expressed by a linear equation. Here, in the straight line, the slope and y-intercept, e.g., −A and B in Equation 1 above, may change according to thermal decomposition tendency.

In the metal-carbon composite included in the anode material for all-solid secondary batteries according to an embodiment, due to the complexation of metal and carbon, thermal decomposition may occur uniformly, so that the deviation of the slope −A and the y-intercept B may be small. Accordingly, in the metal-carbon composite, in Equation 1, ΔA may be about 0.06 or less, and ΔB may be about 30 or less. In such a range, it is possible to implement an anode plate of an all-solid battery by uniform dispersion of the metal particles.

As described above, in the metal-carbon composite in which the metal particles and the carbon material are complexed, a variation in the thermal decomposition temperature range is small, unlike a case of simple mixing. For example, when a plurality of sites are sampled for the same sample and thermogravimetric analysis is performed on each site, in each thermogravimetric analysis, a difference between the final temperature values at the point where no further weight loss occurs at the thermal decomposition temperature of 500° C. or higher may be defined as "a delta value of the thermal decomposition temperature of 500° C. or higher". Since the metal-carbon composite has a small variation in the thermal decomposition temperature range, the delta value of the thermal decomposition temperature at 500° C. or higher may appear smaller than that in the case of simple mixing.

According to an embodiment, in the thermogravimetric analysis of the metal-carbon composite, a delta value of thermal decomposition temperature at 500° C. or higher may be, e.g., about 30° C. or lower. In an implementation, in the thermogravimetric analysis of the metal-carbon composite, a delta value of thermal decomposition temperature of 500° C. or higher may be, e.g., about 25° C. or lower. In an implementation, in the thermogravimetric analysis of the metal-carbon composite, a delta value of thermal decomposition temperature of 500° C. or higher may be, e.g., about 20° C. or lower. In an implementation, in the thermogravimetric analysis of the metal-carbon composite, a delta value of thermal decomposition temperature of 500° C. or higher may be, e.g., about 15° C. The metal-carbon composite may have a delta value of thermal decomposition temperature of 500° C. or higher within the above range, and an anode layer for all-solid secondary batteries, having a uniform distribution of metals from which a flux of Li ions is uniformly induced may be manufactured.

When an anode layer is formed using the above-described metal-carbon composite, e.g., when an anode layer is formed using an anode composition including an anode material including the metal-carbon composite, and an aqueous binder, similarly, thermogravimetric analysis may be performed on the anode layer. That is, a plurality of sites randomly selected from one anode layer are sampled and a thermogravimetric analysis is performed on each site of the anode layer. In each thermogravimetric analysis graph of the anode layer, a straight line connecting points of respective weight percentages (%) at the thermal decomposition temperature of 500° C. and final temperature is expressed by a linear equation represented by Equation 2 below.

$$Y=-A'X+B' \qquad \text{<Equation 2>}$$

In Equation 2, X is thermal decomposition temperature in ° C., Y is a weight loss rate, −A' is a slope, and B' is a y-intercept, and ΔA' may be about 0.07 or less, and ΔB may be about 50 or less. Here, ΔA' means a difference between the values of A', and ΔB' means a difference between the values of B'.

In an implementation, it is assumed that the decomposition of the binder is completed before 500° C.

This means that the distribution of metal in the anode layer of the all-solid secondary battery may be uniform, and may play a key role in realizing the performance of the all-solid battery. The delta value of thermal decomposition temperature of 500° C. or higher of the coated anode layer may be different from the original delta value of thermal decomposition temperature of 500° C. or higher of the metal-carbon composite due to energy and organic matter applied during a slurry preparation process.

The metal-carbon composite may further include a solid electrolyte. The solid electrolyte may be a sulfide solid electrolyte, an oxide solid electrolyte, or a combination thereof.

Hereinafter, an all-solid secondary battery according to embodiments will be described in more detail.

An all-solid secondary battery according to an embodiment may include, e.g., a cathode layer; an anode layer; and a solid electrolyte layer between the cathode layer and the anode layer. The cathode layer may include a cathode current collector and a cathode active material layer on the cathode current collector, and the anode layer may include an anode material including the metal-carbon composite.

[All-Solid Secondary Battery]

Figure 21:
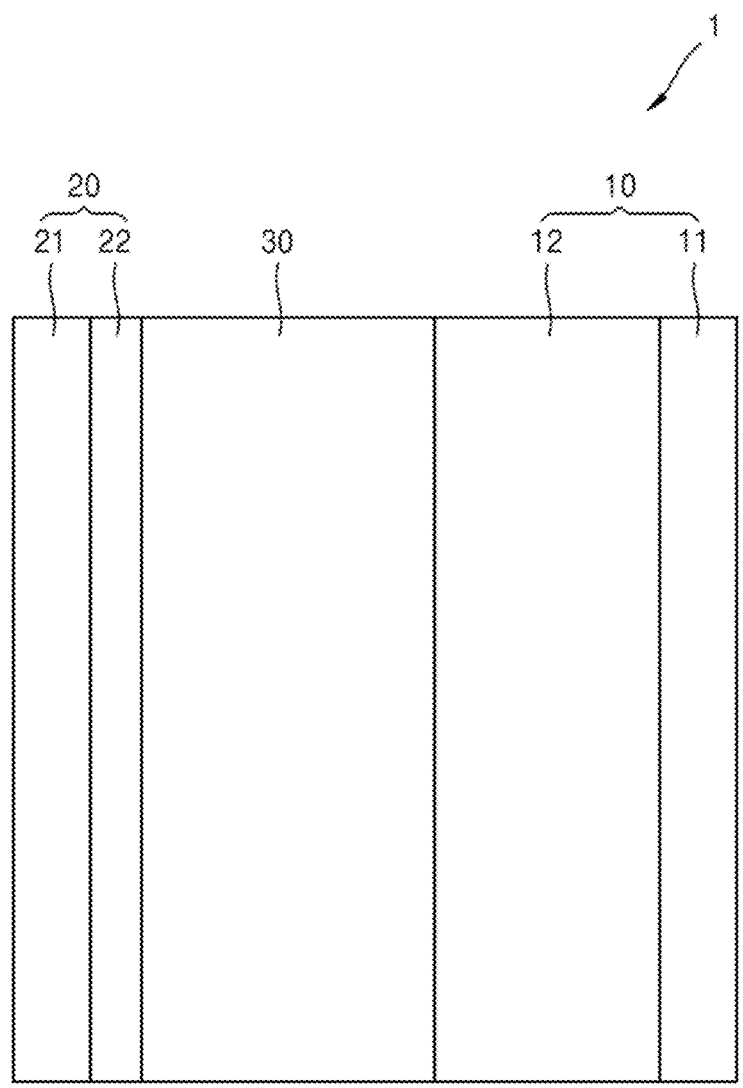
FIGS. 21 to 23 are cross-sectional views of all-solid secondary batteries according to embodiments.

Referring to FIG. 21, an all-solid secondary battery 1 may include a cathode layer 10, an anode layer 20; and a solid electrolyte layer 30 between the cathode layer 10 and the anode layer 20. The cathode layer 10 may include a cathode current collector 11 and a cathode active material layer 12 on the cathode current collector 11, and the anode layer 20 may include an anode current collector 21 and a first anode active material layer 22 on the anode current collector 21 and including the metal-carbon composite according to an embodiment.

[Cathode Layer: Cathode Current Collector]

As the cathode current collector 11, e.g., a plate or foil made of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof, may be used. In an implementation, the cathode current collector 11 may be omitted.

[Cathode Layer: Cathode Active Material Layer]

The cathode active material layer 12 may include, e.g., a cathode active material and a solid electrolyte. The solid electrolyte included in the cathode layer 10 may be similar to or different from the solid electrolyte included in the solid electrolyte layer 30. For details of the solid electrolyte, refer to those of the solid electrolyte layer 30.

The cathode active material may be a cathode active material capable of reversibly absorbing and desorbing lithium ions. In an implementation, the cathode active material may include, e.g., a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganese oxide (NCM), lithium manganate, lithium and iron phosphate, and a nickel sulfide, a copper sulfide, a lithium sulfide, an iron oxide, or a vanadium oxide, or the like. The cathode active materials may each be used alone or as a mixture of two or more thereof.

The cathode active material may be a compound represented by, e.g., $Li_aA_{1-b}B_bD_2$ (where $0.90 \leq a \leq 1$, and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB_cD_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, and $0 \leq \alpha \leq 2$); $Li_aNi_bE_cG_dO_2$ (where $0.90 \leq a \leq 1$, $0 \leq b \leq 0.9$, $0 \leq c \leq 0.5$, and $0.001 \leq d \leq 0$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$, and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where, $0.90 \leq a \leq 1$ and $0.001 \leq b \leq 0.1$); $Li_aNi_bCo_cMn_dGeO_2$ (where, $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1$ and $0.001 \leq b \leq 0.1$); $Li_aCoG_bO_2$ (where, $0.90 \leq a \leq 1$ and $0.001 \leq b \leq 0.1$); $Li_aMnG_bO_2$ (where, $0.90 \leq a \leq 1$ and $0.001 \leq b \leq 0.1$); $Li_aMn_2G_bO_4$ (where, $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$. In the compounds above, A may be, e.g., Ni, Co, Mn, or a combination thereof; B may be, e.g., Al, Ni, Co, Mn, Cr, Fe, Mg, Sr, V, a rare earth element, or a combinations thereof; D may be, e.g., O, F, S, P, or a combination thereof; E may be, e.g., Co, Mn, or a combination thereof; F may be, e.g., F, S, P, or a combination thereof; G is Al, Cr, Mn, Fe, Mg, La, Ce, Sr, V, or a combination thereof; Q may be, e.g., Ti, Mo, Mn, or a combination thereof; I is Cr, V, Fe, Sc, Y, or a combination thereof; and J may be, e.g., V, Cr, Mn, Co, Ni, Cu, or a combination thereof. A compound having a coating layer added on a surface thereof may be also used, and a mixture having the compound described above and a coating layer which are added thereto may be also used. The coating layer added to the surface of the compound includes, for example, a coating element compound of an oxide, a hydroxide, an oxyhydroxide, an oxycarbonate, or a hydroxycarbonate of the coating element. The compound forming the coating layer may be amorphous or crystalline. The coating elements included in the coating layer may include Mg, Al, Co, K, Na, Ca, Si, Ti, V, Sn, Ge, Ga, B, As, Zr, or a mixture thereof. A method of forming the coating layer may be a suitable method that does not adversely affect properties of the cathode active material. The coating method may include, e.g., spraying, coating, or dipping.

The cathode active material may include, e.g., a lithium transition metal oxide having a layered rock salt type structure among the above-described lithium transition metal oxides. The "layered rock salt type structure", e.g., may be a structure wherein an oxygen atom layer and a metal atom layer are alternately and regularly arranged in the direction of <111> of a cubic rock salt type structure, whereby each atom layer forms a two-dimensional plane. "Cubic rock salt type structure" refers to a sodium chloride type (NaCl type) structure, which is a type of crystal structure, and, specifically, has a structure in which face-centered cubic lattices (FCCs) forming each of cations and anions are arranged to be displaced from each other by ½ of a ridge of a unit lattice. A lithium transition metal oxide having the layered rock salt type structure is a ternary lithium transition metal oxide, for example, $LiNi_xCo_yAl_zO_2$ (NCA) or $LiNi_xCo_yMn_zO_2$ (NCM) ($0<x<1$, $0<y<1$, $0<z<1$, $x+y+z=1$). When the cathode active material includes a ternary lithium transition metal oxide having a layered rock salt type structure, the energy density and thermal stability of the all-solid secondary battery may be further improved.

The cathode active material may be covered by the coating layer as described above. The coating layer may include a suitable coating layer for a cathode active material of an all-solid secondary battery. The coating layer may include, e.g., $Li_2O$—$ZrO_2$ or the like.

When the cathode active material includes as a ternary lithium transition metal oxide containing nickel (Ni) such as NCA or NCM, the capacity density of the all-solid secondary battery 1 may be increased, whereby metal elution of the cathode active material in a charged state may be reduced. As a result, cycle characteristics in the charge state of the all-solid secondary battery 1 may be improved.

The shape of the cathode active material may be, e.g., a sphere or an elliptical sphere. The particle diameter of the cathode active material may be a suitable diameter applicable to a conventional all-solid secondary battery. The content of the cathode active material in the cathode 10 may be within a suitable range applicable to a conventional all-solid secondary battery.

[Cathode Layer: Solid Electrolyte]

The cathode active material layer 12 may include, e.g., a solid electrolyte. The solid electrolyte included in the cathode layer 10 may be the same as or different from the solid electrolyte included in the solid electrolyte layer 30. For details of the solid electrolyte, refer to those of the solid electrolyte layer 30.

The solid electrolyte included in the cathode active material layer 12 may have a smaller average particle diameter D50 than that of the solid electrolyte included in the solid electrolyte layer 30. In an implementation, the average particle diameter D50 of the solid electrolyte included in the cathode active material layer 12 may be, e.g., about 90% or less, about 80% or less, about 70% or less, about 60% or less, about 50% or less, about 40% or less, about 30% or less, or about 20% or less of the average particle diameter D50 of the solid electrolyte included in the solid electrolyte layer 30. Here, a particle diameter D50 means a particle size value corresponding to 50% of the amount of particles when the total number of particles is 100% in a distribution curve on which particle diameters are accumulated in the order from the smallest particle size to the largest particle size. D50 may be measured by any suitable method, such as methods that are known to those of ordinary skill in the art. For example, D50 may be measured by a particle size analyzer or maybe measured from a TEM photograph or an SEM photograph. Another example of the methods may include measuring particle diameters by a measuring device utilizing dynamic light-scattering, performing a data analysis process to count the number of particles with respect to each particle size range, and obtaining (e.g., easily obtaining) D50 from the counted particle numbers through the calculation.

[Cathode Layer: Binder]

The cathode active material layer 12 may include a binder. Examples of the binder may include styrene butadiene rubber (SBR), polytetrafluoroethylene, polyvinylidene fluoride, and polyethylene.

[Cathode Layer: Conductive Material]

The cathode active material layer 12 may include a conductive material. Examples of the conductive material may include graphite, carbon black, acetylene black, Ketjen black, carbon fiber, and metal powder.

[Cathode Layer: Other Additives]

In an implementation, the cathode layer 10 may further include additives such as a filler, a coating agent, a dispersing agent, and an ion-conductive auxiliary agent in addition to the above-described cathode active material, solid electrolyte, binder, or a conductive material.

As the filler, coating agent, dispersing agent and ion-conductive auxiliary agent included in the cathode layer 10, suitable materials generally used for electrodes of all-solid secondary batteries may be used.

[Solid Electrolyte Layer]

The solid electrolyte may be a sulfide solid electrolyte.

[Solid Electrolyte Layer: Sulfide Solid Electrolyte]

Figure 22:
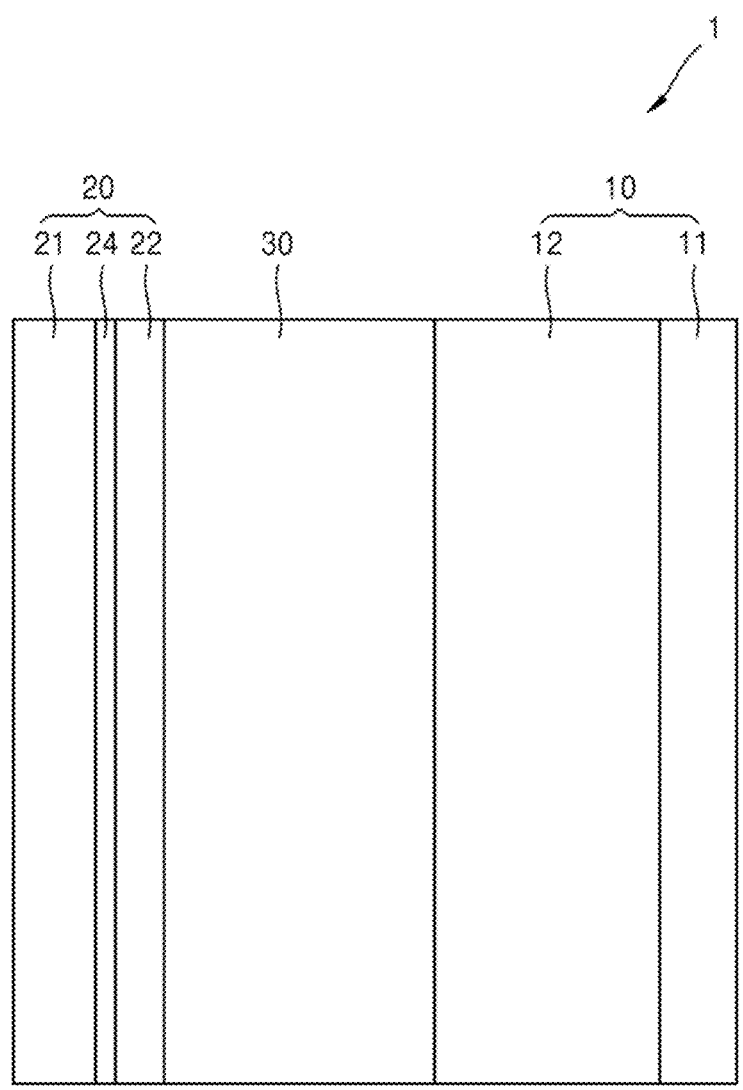
Figure 23:
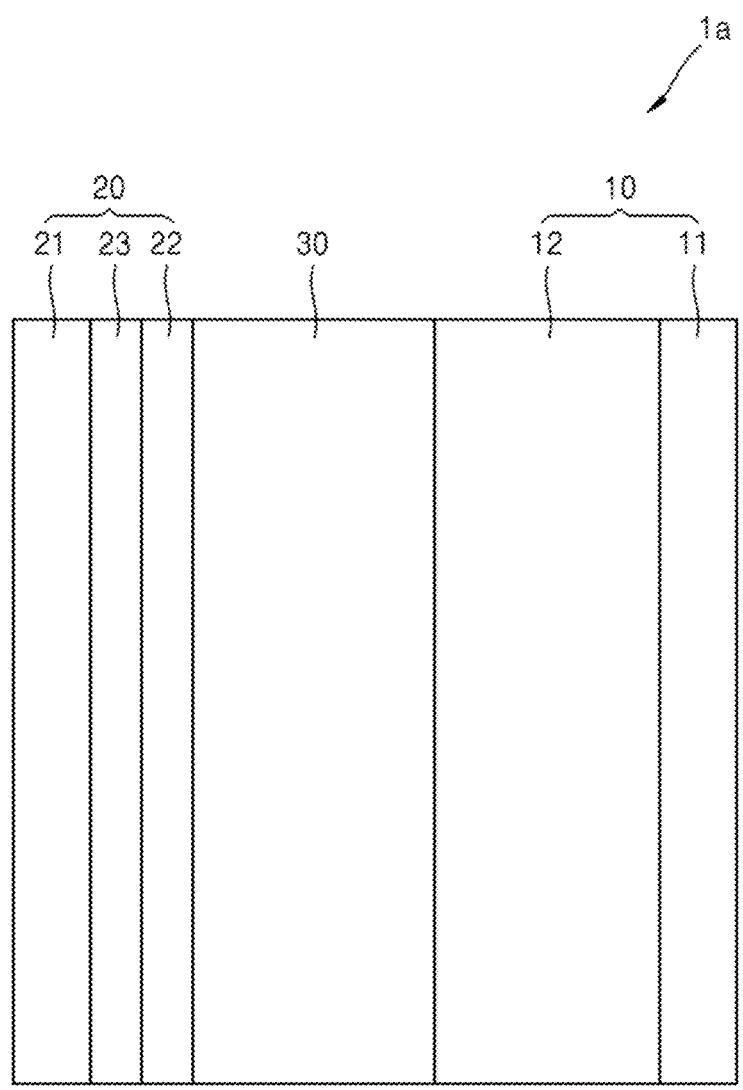

Referring to FIGS. 21 to 23, the solid electrolyte layer 30 may include a sulfide solid electrolyte between the cathode layer 10 and the anode layer 20.

The sulfide solid electrolyte may include, e.g., $P_2S_5$, $Li_2S—P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each a positive number, and Z is one selected from Ge, Zn and Ga), $Li_2S$—$GeS_2$, $Li_2S$—$SiS_2$—$Li_3PO_4$, $Li_2S$—$SiS_2$—$Li_pMO_q$ (where p and q are each a positive number, and M is one selected from P, Si, Ge, B, Al, Ga, and In), $Li_{7-x}PS_{6-x}Cl_x$ ($0 \leq x \leq 2$), $Li_{7-x}PS_{6-x}Br_x$ ($0 \leq x \leq 2$), or $Li_{7-x}PS_{6-x}I_x$ ($0 \leq x \leq 2$). The sulfide solid electrolyte may be prepared by treating a starting material such as $Li_2S$ or $P_2S_5$ by a melt quenching method or a mechanical milling method. After this treatment, heat treatment may be performed. The solid electrolyte may be amorphous, crystalline, or a mixed state thereof. The solid electrolyte may include sulfur (S), phosphorus (P), and lithium (Li) as at least constituent elements among the above-described sulfide solid electrolyte materials. In an implementation, the solid electrolyte may be a material including $Li_2S$—$P_2S_5$. When a solid electrolyte including $Li_2S$—$P_2S_5$ as a material of the sulfide solid electrolyte forming the solid electrolyte, a mixing molar ratio of $Li_2S$ and $P_2S_5$ may be, e.g., about $Li_2S$: $P_2S_5$=about 50:50 to about 90:10.

The sulfide solid electrolyte may be, e.g., an argyrodite-type compound including $Li_{7-x}PS_{6-x}Cl_x$ ($0 \leq x \leq 2$), $Li_{7-x}PS_{6-x}Br_x$ ($0 \leq x \leq 2$), or $Li_{7-x}PS_{6-x}I_x$ ($0 \leq x \leq 2$). In an implementation, the sulfide solid electrolyte may be an argyrodite-type compound including, e.g., $Li_6PS_5Cl$, $Li_6PS_5Br$, or $Li_6PS_5I$.

The density of the argyrodite-type solid electrolyte may be about 1.5 g/cc to about 2.0 g/cc. Maintaining the density at about 1.5 g/cc or more may help reduce the internal resistance of the all-solid secondary battery, and penetration of the solid electrolyte by Li may be effectively suppressed.

In an implementation, an elastic modulus of the solid electrolyte may be, e.g., about 15 GPa to about 35 GPa.

[Solid Electrolyte Layer: Binder]

The solid electrolyte layer 30 may include, e.g., a binder. Examples of the binder included in the solid electrolyte layer 30 may include styrene butadiene rubber (SBR), polytetrafluoroethylene, polyvinylidene fluoride, and polyethylene. A suitable binder may be used. The binder included in the solid electrolyte layer 30 may be the same as or different from the binder included in the cathode active material layer 12 and the first anode active material layer 22.

[Anode Layer]

[Anode Layer Structure]

The thickness of the first anode active material layer 22 may be, e.g., about 50% or less, about 40% or less, about 30% or less, about 20% or less, about 10% or less, or about 5% or less of the thickness of the cathode active material layer 12. The thickness of the first anode active material layer 22 may be, e.g., about 1 μm to about 20 μm, about 2 μm to about 10 μm, or about 3 μm to about 7 μm. If the first anode active material layer 22 were to be too thin, lithium dendrites formed between the first anode active material layer 22 and the anode current collector 21 could collapse the first anode active material layer 22, and it could be difficult to improve the cycle characteristics of the all-solid secondary battery 1. If the thickness of the first anode active material layer 22 were too great, the energy density of the all-solid secondary battery 1 could decrease, and the internal resistance of the all-solid secondary battery 1 by the first anode active material layer 22 could increase, so that it could be difficult to improve the cycle characteristics of the all-solid secondary battery 1.

When the thickness of the first anode active material layer 22 decreases, e.g., the charging capacity of the first anode active material layer 22 may also decrease. The charging capacity of the first anode active material layer 22 may be, e.g., about 50% or less, about 40% or less, about 30% or less, about 20% or less, about 10% or less, about 5% or less, or about 2% or less of the charging capacity of the cathode active material layer 12. The charging capacity of the first anode active material layer 22 may be, e.g., about 0.1% to about 50%, about 0.1% to about 40%, about 0.1% to about 30%, about 0.1% to about 20%, about 0.1% to about 10%, about 0.1% to about 5%, or about 0.1% to about 2% of the charging capacity of the cathode active material layer 12. If the charging capacity of the first anode active material layer 22 were to be too small, the first anode active material layer 22 could become very thin, and lithium dendrites formed between the first anode active material layer 22 and the anode current collector 21 during repeated charging and discharging processes could collapse the first anode active material layer 22, so that it could be difficult to improve the cycle characteristics of the all-solid secondary battery 1. If the charging capacity of the first anode active material layer 22 were to be too great, the energy density of the all-solid secondary battery 1 could decrease, and the internal resistance of the all-solid secondary battery 1 by the first anode active material layer 22 could increase, so that it could be difficult to improve the cycle characteristics of the all-solid secondary battery 1.

The charging capacity of the cathode active material layer 12 may be obtained by multiplying the charging capacity density (mAh/g) of the cathode active material by the weight of the cathode active material in the cathode active material layer 12. When several types of cathode active materials are used, the values of charge capacity density x weight are calculated for respective cathode active materials, and the sum of these values is the charging capacity of the cathode active material layer 12. The charging capacity of the first anode active material layer 22 is calculated in the same way.

In an implementation, the charging capacity of the first anode active material layer 22 may be obtained by multiplying the charging capacity density (mAh/g) of the anode active material by the weight of the anode active material in the first anode active material layer 22. When several types of anode active materials are used, the values of charge capacity density x weight are calculated for respective anode active materials, and the sum of these values is the charging capacity of the first anode active material layer 22. In an implementation, the charge capacity densities of the cathode active material and the anode active material are estimated using an all-solid half-cell using lithium metal as a counter electrode. The charging capacities of the cathode active material layer 12 and the first anode active material layer 22 may be directly measured by the measurement of the charging capacity using the all-solid half-cell. When the measured charge capacity is divided by the weight of each active material, the charging capacity density is obtained. In an implementation, the charging capacities of the cathode active material layer 12 and the first anode active material layer 22 may be initial charging capacities measured during the first charging cycle.

[Anode Layer: Anode Current Collector]

The anode current collector 21 may be made of, e.g., a material that does not react with lithium, e.g., does not form an alloy or a compound. Examples of the material constituting the anode current collector 21 may include stainless steel, aluminum (Al), copper (Cu), titanium (Ti), iron (Fe), cobalt (Co), and nickel (Ni). A suitable material may be used as long as it is used to constitute a current collector. The thickness of the anode current collector may be, e.g., about 1 μm to about 20 μm, about 5 μm to about 15 μm, or about 7 μm to about 10 μm.

The anode current collector 21 may be made of one of the above-described metals or an alloy of two or more metals, or may be made of a coating material. The anode current collector 21 may be in the form of a plate or foil.

In an implementation, referring to FIG. 22, the all-solid secondary battery 1 may further include, e.g., a thin film 24 containing an element capable of forming an alloy with lithium. The thin film 24 may be between the anode current collector 21 and the first anode active material layer 22. The thin film 24 may include, e.g., an element capable of forming an alloy with lithium. Examples of the element capable of forming an alloy with lithium may include gold, silver, zinc, tin, indium, silicon, aluminum, and bismuth. A suitable element may be used as long as it forms an alloy with lithium. The thin film 24 may be formed of one of these metals or may be formed of an alloy of several types of metals. The thin film 24 may be on the anode current collector 21, e.g., the deposition form of the second anode active material layer (not shown) deposited between the thin film 24 and the first anode active material layer 22 may be further flattened, and the cycle characteristics of the all-solid secondary battery 1 may be further improved.

A thickness of the thin film 24 may be, e.g., about 1 nm to about 800 nm, about 10 nm to about 700 nm, about 50 nm to about 600 nm, or about 100 nm to about 500 nm. If the thickness of the thin film 24 were to be less than about 1 nm, it could be difficult to exert a function as the thin film 24. If the thickness of the thin film 24 were to be too thick, the thin film 24 itself could absorb lithium to decrease the amount of lithium deposited in an anode layer 20 decreases, so that the energy density of the all-solid secondary battery 1 could decrease, and the cycle characteristics of the all-solid secondary battery 1 may be deteriorated. In an implementation, the thin film 24 may be deposited on the anode current collector 21 by, e.g., a vacuum deposition method, a sputtering method, a plating method, or the like.

[Anode Layer: Anode Active Material]

The first anode active material layer 22 may contain a metal-carbon composite according to an embodiment.

[Anode Layer: Deposition Layer]

In an implementation, referring to FIG. 23, the all-solid-state secondary battery 1a may further include a second anode active material layer 23 between the anode current collector 21 and the first anode active material layer 22 by charging. In an implementation, the all-solid-state secondary battery 1a may further include a second anode active material layer 23 between the solid electrolyte layer 30 and the first anode active material layer 22 by charging or may be configured to include the second anode active material layer 23 alone. The second anode active material layer 23 may be a metal layer including lithium or a lithium alloy. The metal layer may include lithium or a lithium alloy. In an implementation, the second anode active material layer 23 may be a metal layer including lithium, and may function as, e.g., a lithium reservoir. The lithium alloy may include a metal element, a metalloid element, or a combination thereof, the metal element or metalloid element being capable of forming an alloy with lithium. Examples of the lithium alloy may include a Li—Al alloy, a Li—Sn alloy, a Li—In alloy, a Li—Ag alloy, a Li—Au alloy, a Li—Zn alloy, a Li—Ge alloy, and a Li—Si alloy. A suitable lithium alloy may be used. The second anode active material layer 23 may be made of one of these alloys, or lithium, or may be made of several kinds of alloys.

A thickness of the second anode active material layer 23 may be, e.g., about 1 μm to about 1,000 μm, about 1 μm to about 500 μm, about 1 μm to about 200 μm, about 1 μm to about 150 μm, about 1 μm to about 100 μm, or about 1 μm to about 50 μm. If the thickness of the second anode active material layer 23 were to be too thin, it could difficult for the second anode active material layer 23 to serve as a lithium reservoir. If the thickness of the second anode active material layer 23 were to be too thick, the weight and volume of the all-solid secondary battery 1a could increase, and the cycle characteristics thereof could be rather deteriorated. The second anode active material layer 23 may be, e.g., a metal foil having a thickness within this range.

In the all-solid secondary battery 1a, the second anode active material layer 23 may be between the anode current collector 21 and the first anode active material layer 22 before assembly of the all-solid secondary battery 1a or may be deposited between the anode current collector 21 and the first anode active material layer 22 by charging after assembly of the all-solid secondary battery 1a.

When the second anode active material layer 23 is between the anode current collector 21 and the first anode active material layer 22 before assembly of the all-solid secondary battery 1a, the second anode active material layer 23 may be a metal layer including lithium, and it may function as a lithium reservoir. In an implementation, the cycle characteristics of the all-solid secondary battery 1a including the second anode active material layer 23 may be further improved. In an implementation, a lithium foil may be between the anode current collector 21 and the first anode active material layer 22 before assembly of the all-solid secondary battery 1a.

When the second anode active material layer 23 is deposited by charging after assembly of the all-solid secondary battery 1a, the second anode active material layer 23 may not be included during assembly of the all-solid secondary battery 1a, so that the energy density of the all-solid secondary battery 1*a* may increase. In an implementation, when charging the all-solid secondary battery 1*a*, the all-solid secondary battery 1*a* may be charged to exceed the charging capacity of the first anode active material layer 22. In an implementation, the first anode active material layer 22 may be overcharged. At the initial stage of charging, lithium may be absorbed in the first anode active material layer 22. In an implementation, the anode active material included in the first anode active material layer 22 may form an alloy or compound with lithium ions that have migrated from the cathode active material layer 12. When the all-solid secondary battery 1*a* is charged to exceed the charging capacity of the first anode active material layer 22, e.g., lithium may be deposited on the rear surface of the first anode active material layer 22, e.g., between the anode current collector 21 and the first anode active material layer 22, and a metal layer corresponding to the second anode active material layer 23 may be formed by the deposited lithium. The second anode active material layer 23 may be a metal layer mainly including lithium (e.g., metallic or non-compounded lithium). Such a result may be obtained, e.g., when the anode active material included in the first anode active material layer 22 is composed of a material that forms an alloy or compound with lithium. During discharging, lithium in the first anode active material layer 22 and the second anode active material layer 23, e.g., the metal layer, may be ionized and may move toward the cathode layer 10. Accordingly, it is possible to use lithium as an anode active material in the all-solid secondary battery 1*a*. In an implementation, the first anode active material layer 22 may cover the second anode active material layer 23, and it may serve as a protective layer for the second anode active material layer 23, e.g., the metal layer, and may help suppress the deposition growth of lithium dendrites. Therefore, the short circuit and capacity reduction of the all-solid secondary battery 1*a* may be suppressed, and as a result, the cycle characteristics of the all-solid secondary battery 1*a* may be improved. In an implementation, when the second anode active material layer 23 is disposed by charging after assembly of the all-solid secondary battery 1*a*, the anode current collector 21 and the first anode active material layer 22 and the region therebetween may be, e.g., Li-free regions that do not include lithium (Li) in the initial state or post-discharge state of the all-solid secondary battery.

Next, a method of manufacturing an all-solid secondary battery according to an embodiment will be described.

The method may include, e.g., providing the anode layer according to an embodiment; providing a cathode layer; providing a solid electrolyte layer between the anode layer and the cathode layer to prepare a laminate; and pressing the laminate.

The pressing of the laminate may be performed at a temperature of about 25° C. to about 90° C., and the laminate may be pressed by a pressure of 550 MPa or lower, e.g., about 400 MPa to about 500 MPa, thereby completing an all-solid secondary battery. The pressing time may vary depending on temperature and pressure, e.g., less than 30 minutes. The pressing may be, e.g., isostatic pressing, roll pressing, or plate pressing.

The thickness of the pressed cathode active material layer may be, e.g., about 100 μm to about 150 μm, the thickness of the pressed anode active material layer may be about 10 μm to about 15 μm, and the thickness of the solid electrolyte layer may be about 100 μm to about 150 μm.

The all-solid secondary battery according to an embodiment may be applicable to medium and large batteries or an energy storage system (ESS).

A method of manufacturing an all-solid secondary battery according to another embodiment will be described.

An all-solid secondary battery may be manufactured by the processes of, e.g., providing an anode layer including an anode current collector and a first anode active material layer; providing a cathode layer; providing a solid electrolyte layer between the anode layer and the cathode layer to prepare a laminate; and pressing the laminate.

The first anode active material layer may include the above-described anode material including a metal-carbon composite.

In the process of providing the anode layer, the anode layer may be prepared by applying a composition including a metal-carbon composite, a binder, and a solvent onto the anode current collector and drying the composition.

As the binder, an aqueous binder, an organic binder, or a combination thereof may be used. As the binder, e.g., polyvinyl alcohol, carboxymethyl cellulose, hydroxypropyl cellulose, diacetyl cellulose, polyvinyl chloride, carboxylated polyvinyl chloride, polyvinyl fluoride, polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, or a combination thereof may be used.

As the aqueous binder, styrene butadiene rubber (SBR), carboxymethyl cellulose (CMC), or a combination thereof may be used. When using the aqueous binder, water is used as a solvent.

As the organic binder, polytetrafluoroethylene, polyvinylidene fluoride, or the like may be used. When using such an organic binder, N-methylpyrrolidone (NMP) or the like may be used as a solvent.

The metal-carbon composite may be prepared as described above by processes of, e.g., mixing a carbon material, a metal precursor, a polyol, and a solvent to obtain a mixture; and applying light or heat to the mixture.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

PREPARATION EXAMPLE 1

Preparation of Metal-Carbon Composite

In a 100 mL reactor, 50 mL of glycerol (99.9%, Aldrich) and 0.5 mmol of polyvinylpyrrolidone (PVP) (Mw=55,000, Aldrich) were heated to 80° C. The resultant was mixed until it became a transparent solution, and then cooled to 30° C. to obtain a reaction mixture. Subsequently, 5 g of first carbon black was added to the reaction mixture and mixing was performed for 10 minutes, and then 50 mmol of $AgNO_3$ (99.9%, Aldrich) was added thereto and mixing was performed for 5 minutes. This mixture was heated to 100° C., and then was reacted for 12 hours. The first carbon black has a primary particle size of about 38 nm, a specific surface area of 54 $m^2/g$, and a bulk density of 0.31 $g/cm^3$.

50 mL of deionized water (DI water) was added, and then sonication was performed for 2 minutes. Subsequently, glycerol and polyvinylpyrrolidone were separated from first carbon black supported with silver using a glass filter, and first carbon black supported with silver was washed using ethanol and deionized water (DI water).

After the washing, drying was performed in a vacuum oven at 90° C. for 8 hours or more to prepare a metal-carbon (e.g., silver-carbon) composite. In the silver-carbon composite, the content of silver was 5 wt %, and the content of carbon was 95 wt %.

PREPARATION EXAMPLE 2

Preparation of Metal-Carbon Composite

A silver-carbon composite was prepared in the same manner as in Preparation Example 1, except that the content of silver in the silver-carbon composite was changed to 30 wt % and the content of carbon in the silver-carbon composite was changed to 70 wt % by adjusting the contents of metal precursors in Preparation Example 2.

PREPARATION EXAMPLE 3

Preparation of Metal-Carbon Composite

A silver-carbon composite was prepared in the same manner as in Preparation Example 1, except that the content of silver in the silver-carbon composite was changed to 2 wt % and the content of carbon in the silver-carbon composite was changed to 98 wt % by adjusting the contents of metal precursors in Preparation Example 2.

PREPARATION EXAMPLE 4

Preparation of Metal-Carbon Composite

A silver-carbon composite was prepared in the same manner as in Preparation Example 1, except that second carbon black having a primary particle size of about 30 nm to about 33 nm and a specific surface area of about 60 $m^2/g$ to about 65 $m^2/g$ was used instead of the first carbon black in Preparation Example 1.

COMPARATIVE PREPARATION EXAMPLE 1

Preparation of Metal-Carbon Blend

Silver and carbon were prepared, respectively, and dry mixing (3,000 rpm, 3 times for 3 minutes) was performed using a Thinky mixer to prepare a silver-carbon blend. As silver, particles of 60 nm or submicron size were used. As carbon, first carbon black having a primary particle size of about 38 nm, a specific surface area of 54 $m^2/g$, and a bulk density of 0.31 $g/cm^3$ was used.

In the silver-carbon blend of Comparative Preparation Example 1, the content of silver was 5 wt %, and the content of carbon was 95 wt %.

COMPARATIVE PREPARATION EXAMPLE 2

Preparation of Metal-Carbon Blend

A silver-carbon blend was prepared in the same manner as in Comparative Preparation Example 1, except that the content of silver was changed to 25 wt %, and the content of carbon was changed to 75 wt %.

COMPARATIVE PREPARATION EXAMPLE 3

Preparation of Metal-Carbon Blend

A silver-carbon blend was prepared in the same manner as in Comparative Preparation Example 1, except that the content of silver was changed to 30 wt %, and the content of carbon was changed to 70 wt %.

COMPARATIVE PREPARATION EXAMPLE 4

100% Carbon

Carbon black not being supported with silver and having a silver content of 0 wt % and a carbon content of 100 wt % was used as Comparative Preparation Example 4.

COMPARATIVE PREPARATION EXAMPLE 5

Preparation of Metal-Carbon Blend

A silver-carbon blend was prepared in the same manner as in Comparative Preparation Example 1, except that second carbon black having a primary particle size of about 30 nm to about 33 nm and a specific surface area of about 60 $m^2/g$ to about 65 $m^2/g$ was used instead of the first carbon black of Comparative Preparation Example 1.

EXAMPLE 1

(Manufacturing of Anode Layer)

A SUS foil having a thickness of 10 μm was prepared as an anode current collector. Further, 9.2 g of the silver-carbon composite powder obtained in Preparation Example 1 having an average particle diameter of about 30 nm, as an anode active material, was introduced into a container, and 0.8 g of SBR and CMC binders at a weight ratio of 2:1, which are aqueous binders, were added thereto to prepare a mixed solution. Subsequently, the mixed solution was stirred while adding 30 g of water little by little to this mixed solution to prepare a slurry. The slurry was applied onto the SUS foil using a bar coater, and dried in a convection oven at 80° C. for 10 minutes to obtain a laminate. The obtained laminate was dried in vacuum at 40° C. for 10 hours. An anode layer in which the first anode active material layer is formed on the anode current collector was manufactured by the above processes.

(Manufacturing of Solid Electrolyte Layer)

An acrylic binder (SX-A334, Zeon Co., Ltd.) was added to octyl acetate to prepare a 4 wt % binder solution. The acrylic binder solution was added to a solid electrolyte $Li_6PS_5Cl$ (D50=3 μm, crystalline), which is argyrodite-type crystal, followed by mixing using a Thinky mixer to prepare a slurry. The slurry includes 1.5 parts by weight of the acrylic binder with respect to 98.5 parts by weight of the solid electrolyte. The slurry was applied onto a non-woven fabric using a bar coater, and dried in a convection oven at 80° C. for 10 minutes to obtain a laminate. The obtained laminate was dried in vacuum at 70° C. for 2 hours. A solid electrolyte layer was manufactured by the above processes.

(Manufacturing of Cathode Layer)

$LiNi_{0.8}Co_{0.15}Mn_{0.05}O_2$ (NCM) was prepared as a cathode active material. $Li_6PS_5Cl$ (D50=1 μm or less, crystalline), which is argyrodite-type crystal, was used as a solid electrolyte. Further, a polytetrafluoroethylene (PTFE) binder (Teflon binder of DuPont Corporation) was prepared as a binder, and carbon black (CB) and carbon nanofibers (CNF)

were prepared as a conducting agent. A cathode active material composition in which these materials are mixed with a xylene solvent at a weight ratio of cathode active material: solid electrolyte: carbon black: carbon nanofiber: binder=85.5:10:1.5:1.5:1.5 was molded into a sheet, followed by drying in vacuum at 40° C. for 8 hours to manufacture a cathode layer.

(Manufacturing of All-Solid Secondary Battery)

The solid electrolyte layer was disposed between the cathode layer and the anode layer to prepare a laminate. The laminate was isotactic-pressed by a pressure of 490 MPa at 80° C. for 60 minutes to manufacture an all-solid secondary battery. The solid electrolyte was sintered by such isotactic-pressing, thereby improving battery characteristics. The thickness of the pressed cathode active material layer was about 120 μm, the thickness of the pressed anode active material layer was 12 μm, and the thickness of the pressed solid electrolyte layer was 120 μm.

EXAMPLE 2

An anode layer and an all-solid secondary battery were manufactured in the same manner as in Example 1, except that, when preparing a slurry for manufacturing an anode layer, the silver-carbon composite of Preparation Example 2 was used instead of the silver-carbon composite of Preparation Example 1.

EXAMPLE 3

An anode layer and an all-solid secondary battery were manufactured in the same manner as in Example 1, except that, when preparing a slurry for manufacturing an anode layer, the silver-carbon composite of Preparation Example 3 was used instead of the silver-carbon composite of Preparation Example 1.

EXAMPLE 4

An anode layer and an all-solid secondary battery were manufactured in the same manner as in Example 1, except that, when preparing a slurry for manufacturing an anode layer, the silver-carbon composite of Preparation Example 4 was used instead of the silver-carbon composite of Preparation Example 1.

COMPARATIVE EXAMPLE 1

An anode layer and an all-solid secondary battery were manufactured in the same manner as in Example 1, except that, when preparing a slurry for manufacturing an anode layer, the silver-carbon blend of Comparative Preparation Example 1 was used instead of the silver-carbon composite of Preparation Example 1.

COMPARATIVE EXAMPLE 2

An anode layer and an all-solid secondary battery were manufactured in the same manner as in Example 1, except that, when preparing a slurry for manufacturing an anode layer, the silver-carbon blend of Comparative Preparation Example 2 was used instead of the silver-carbon composite of Preparation Example 1.

COMPARATIVE EXAMPLE 3

An anode layer and an all-solid secondary battery were manufactured in the same manner as in Example 1, except that, when preparing a slurry for manufacturing an anode layer, the silver-carbon blend of Comparative Preparation Example 3 was used instead of the silver-carbon composite of Preparation Example 1.

COMPARATIVE EXAMPLE 4

An anode layer and an all-solid secondary battery were manufactured in the same manner as in Example 1, except that, when preparing a slurry for manufacturing an anode layer, the carbon material of Comparative Preparation Example 4 was used instead of the silver-carbon composite of Preparation Example 1.

COMPARATIVE EXAMPLE 5

An anode layer and an all-solid secondary battery were manufactured in the same manner as in Example 1, except that, when preparing a slurry for manufacturing an anode layer, the silver-carbon blend of Comparative Preparation Example 5 was used instead of the silver-carbon composite of Preparation Example 1.

COMPARATIVE EXAMPLE 6

An anode layer and an all-solid secondary battery were manufactured in the same manner as in Example 1, except that, when preparing a slurry for manufacturing an anode layer, the silver-carbon blend of Comparative Preparation Example 1 was used instead of the silver-carbon composite of Preparation Example 1 and that poly(vinylidene fluoride) (PVdF) was used as an organic binder instead of the aqueous binder of SBR and CMC.

EVALUATION EXAMPLE 1

Scanning Transmission Electron Microscopy (STEM) Analysis

Transmission electron microscopy (STEM) analysis was performed on the silver-carbon composite prepared according to Preparation Example 1 and the silver-carbon blend prepared according to Comparative Preparation Example 1. For the STEM analysis, JEM-ARM200F microscope of JEOL Ltd. was used, and the analysis results thereof are shown in FIGS. 3 and 4, respectively.

Figure 3:
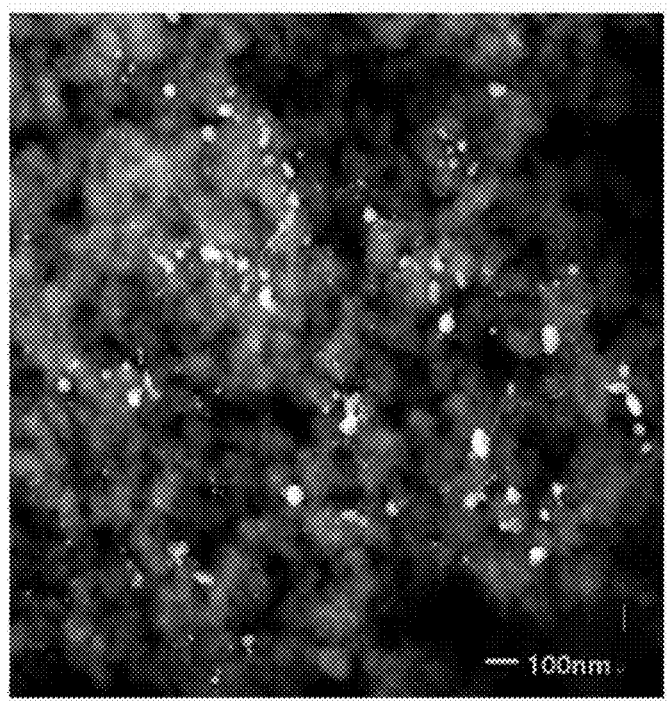
FIG. 3 is a scanning transmission electron microscope (STEM) image of a silver-carbon composite prepared according to Preparation Example 1.

As shown in FIG. 3, it may be seen that, in the silver-carbon composite prepared according to Preparation Example 1, silver particles were not aggregated even after mixing the slurry, and silver was uniformly dispersed in carbon.

Figure 4:
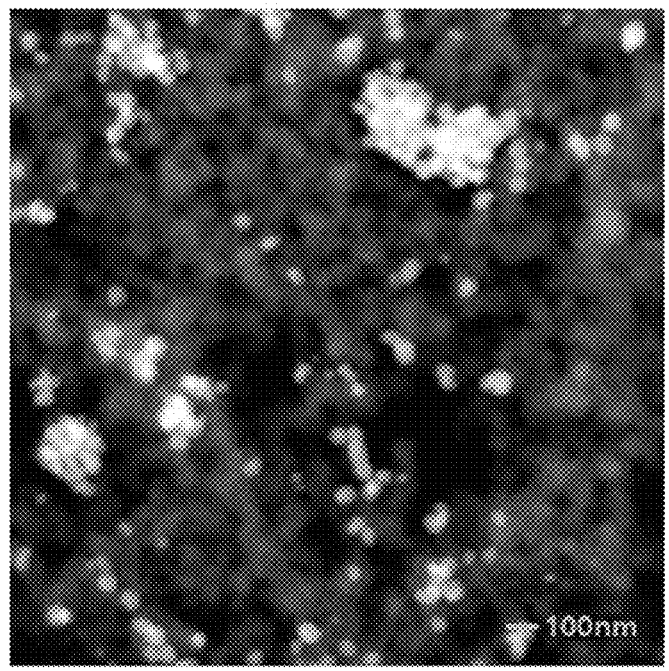
FIG. 4 is a STEM image of a silver-carbon blend prepared according to Comparative Preparation Example 1, after dry mixing.

In contrast, as shown in FIG. 4, it may be seen that, in the silver-carbon blend prepared according to Comparative Preparation Example 1, aggregation of silver particles occurred after mixing the slurry, and that, in the case of the blend slurry, it was difficult to avoid the aggregation of the silver particles.

EVALUATION EXAMPLE 2

Transmission Electron Microscope (TEM) Analysis

Transmission electron microscope (TEM) analysis was performed on the cross-sections of the anode layers prepared according to Example 1 and Comparative Example 2. For the TEM analysis, Titan cubed G2 60-300 of FEI Ltd. was used, and the analysis results thereof are shown in FIGS. 5 and 6, respectively.

Figure 5:
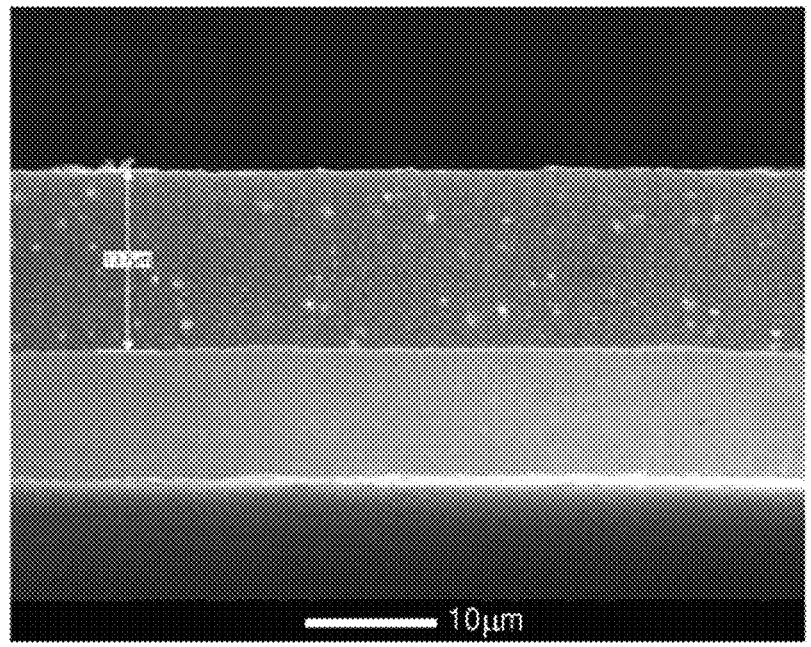
FIG. 5 is a cross-sectional transmission electron microscope (TEM) image of an anode layer prepared according to Example 1.

As shown in FIG. 5, it may be seen that, in the anode layer of Example 1 prepared using the silver-carbon composite prepared according to Preparation Example 1, aggregation of particles was not observed, and the particles were present in sub-micro sizes.

Figure 6:
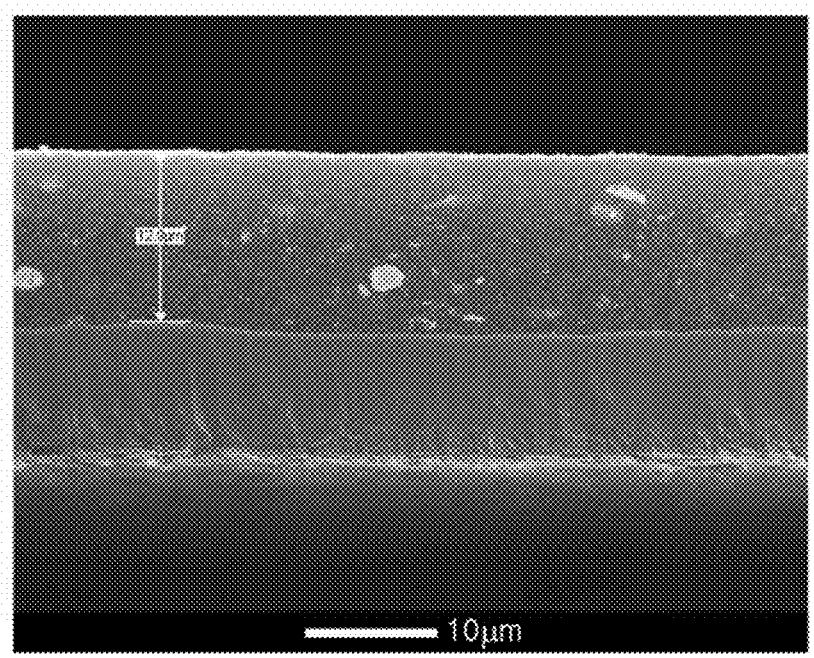
FIG. 6 is a cross-sectional transmission electron microscope (TEM) image of an anode layer prepared according to Comparative Example 2.

In contrast, as shown in FIG. 6, it may be found that, in the anode layer of Comparative Example 2 prepared using the silver-carbon blend prepared according to Comparative Preparation Example 2, aggregation of particles was observed.

EVALUATION EXAMPLE 3

X-Ray Diffraction (XRD) Analysis

Figure 7:
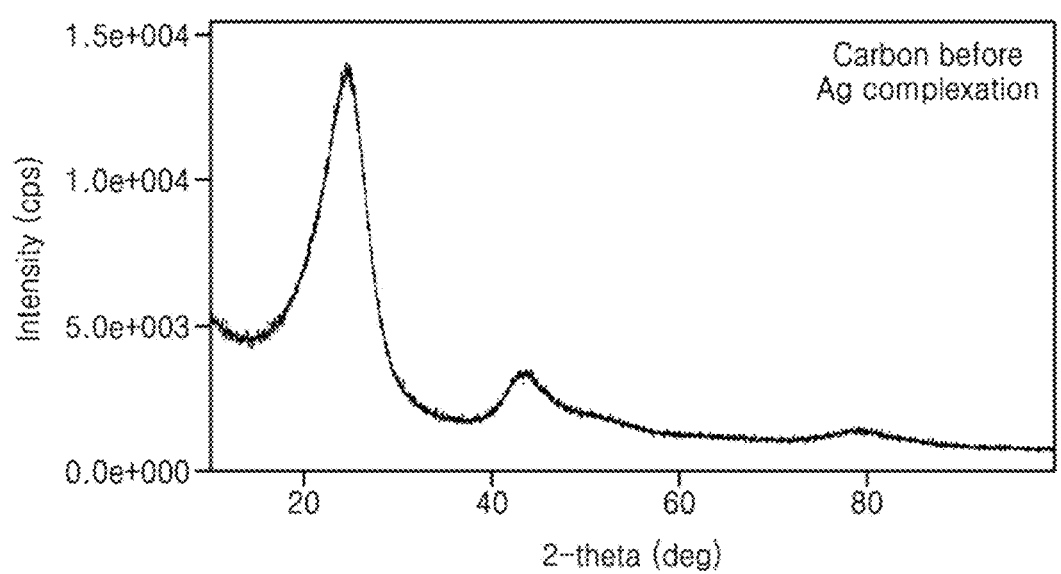
FIGS. 7 and 8 illustrate X-ray diffraction (XRD) spectra of the silver-carbon composite prepared according to Preparation Example 1, before and after silver complexation, respectively.
Figure 8:
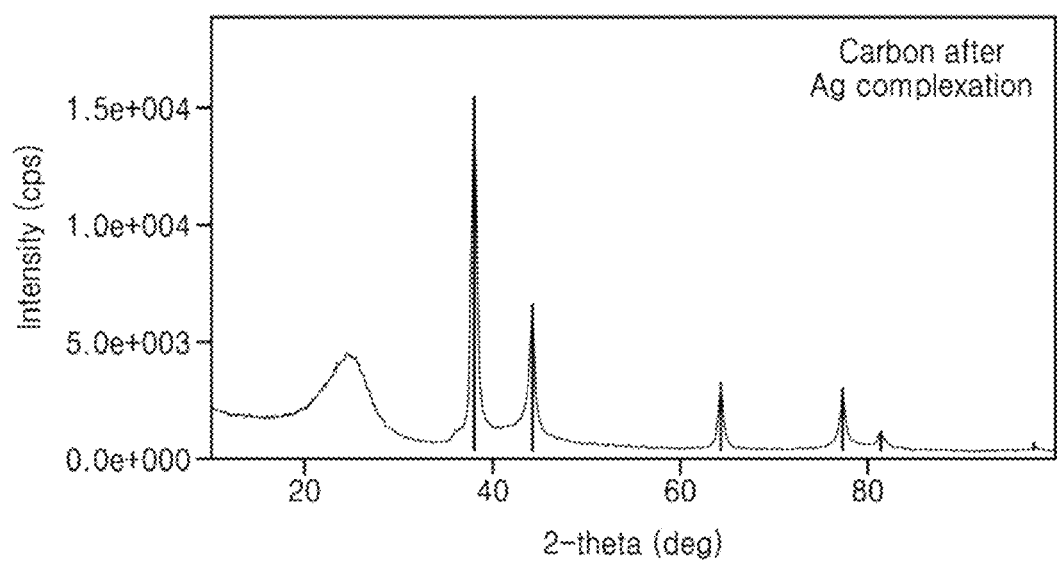

X-ray diffraction (XRD) analysis of the silver-carbon composite prepared according to Preparation Example 1 before and after silver complexation was performed obtained using CuK a rays, and the results thereof are shown in FIGS. 7 and 8, respectively. Measurement condition of XRD is that $\theta$ is in a range of 10° to 90°, and a scan rate is 10°/min.

As shown in FIGS. 7 and 8, comparing the XRD data before and after complexation, it may be seen that in the XRD of the silver-carbon composite, after silver complexation, crystalline peaks of Ag appeared at a 2theta value of 38.1°, 44.3°, 64.5°, 77.5°, and 81.33°. No peaks other than the crystalline peaks of Ag were observed.

EVALUATION EXAMPLE 4

Raman Analysis

Figure 9:
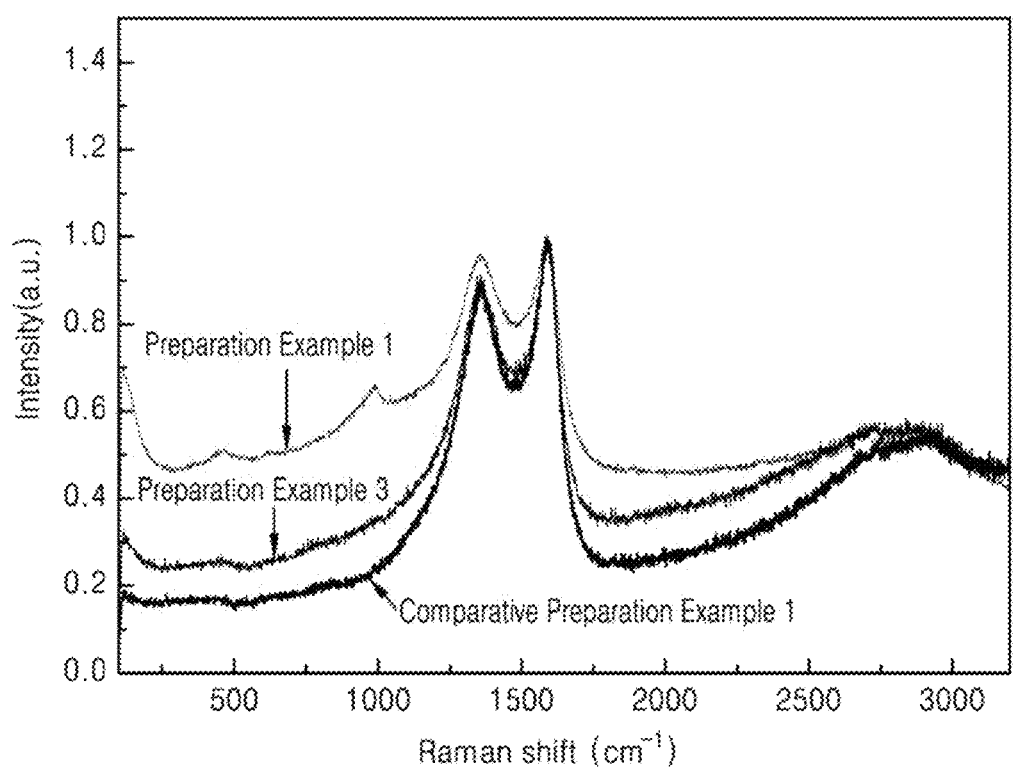
FIG. 9 illustrate the results of Raman analysis of silver-carbon composites prepared according to Preparation Examples 1 and 3 and a silver-carbon blend prepared according to Comparative Preparation Example 1.

Raman analysis was performed on the silver-carbon composites prepared according to Preparation Examples 1 and 3 and the silver-carbon blend prepared according to Comparative Preparation Example 1, and the results thereof are shown in FIG. 9. Raman spectrum was measured using a UV laser having a wavelength of about 514~516 nm in the following order.
1. Place the sample where the microscope can focus.
2. Using a UV laser having a wavelength of about 514~516 nm, focus the sample under a 50x microscope.
3. Set the wavelength condition as the range of 100 to 3200 Raman shift·cm$^{-1}$ and the median value as 1650 Raman shift·cm$^{-1}$.
4. Use the laser beam intensity at 5%, scan the entire range for 60 seconds, and then repeat the measurement of a Raman spectrum 3 times.

As shown in FIG. 9, it may be seen that, in the silver-carbon composite of Preparation Example 1, peaks appeared near 470 cm$^{-1}$, and 990 cm$^{-1}$. In the case of the silver-carbon composite of Preparation Example 3, the amount of supported silver was small, and thus there was almost no peak.

In contrast, in the silver-carbon blend of Comparative Preparation Example 1, only the D/G band peak appeared.

Meanwhile, in order to check whether bonding exists according to the silver content in a simple blend, Raman analysis was performed on the silver-carbon blends according to Comparative Preparation Examples 1 and 2 and the carbon material on which silver was not supported according to Comparative Preparation Example 4, and the results thereof are shown in FIG. 11.

As shown in FIG. 11, in the case of the simple blend, peak generation and change according to the Ag content (0%, 5%, 25%) were not observed. This means that a bond between Ag and carbon was not formed by simple blending alone.

Further, Raman analysis was performed on Ag nanopowder, and the results thereof are shown in FIG. 12. As shown in FIG. 12, even though measurement of the silver nanopowder was performed three times, it was found that Raman analysis was difficult because there was no vibration due to a specific bonding as expected.

EVALUATION EXAMPLE 5

Thermogravimetric (TGA) Analysis

Thermogravimetric (TGA) analysis was performed on the silver-carbon composites prepared according to Preparation Examples 1 and 3 and the silver-carbon blends prepared according to Comparative Preparation Examples 2 and 3. Thermogravimetric analysis was performed using TGA8000 of PerkinElmer Inc. In the thermogravimetric analysis, each sample was waited at 30° C. for 15 minutes in an air atmosphere, and then the temperature was increased to 900° C. at a rate of 10° C./min to measure the weight percentage according to weight loss. The analysis results for each of the silver-carbon composites and silver-carbon blends were measured with five samples. The results of some thermogravimetric analysis of the silver-carbon composites prepared according to Preparation Examples 1 and 3 and the silver-carbon blends prepared according to Comparative Preparation Examples 2 and 3 are shown in FIGS. 13 to 16.

Figure 13:
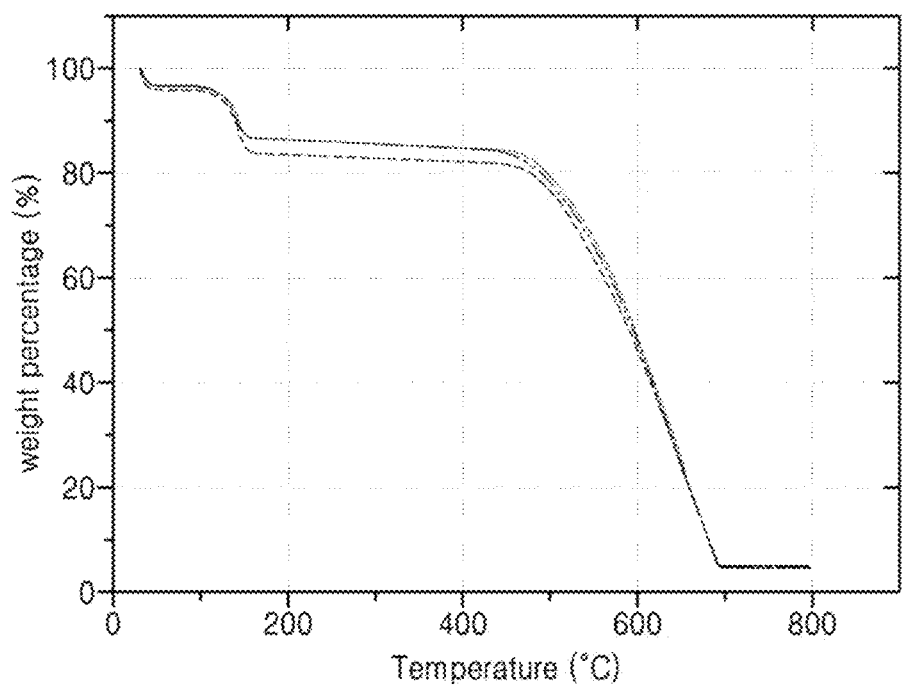
FIG. 13 illustrates the results of thermogravimetric analysis of a silver-carbon composite prepared according to Preparation Example 1.
Figure 14:
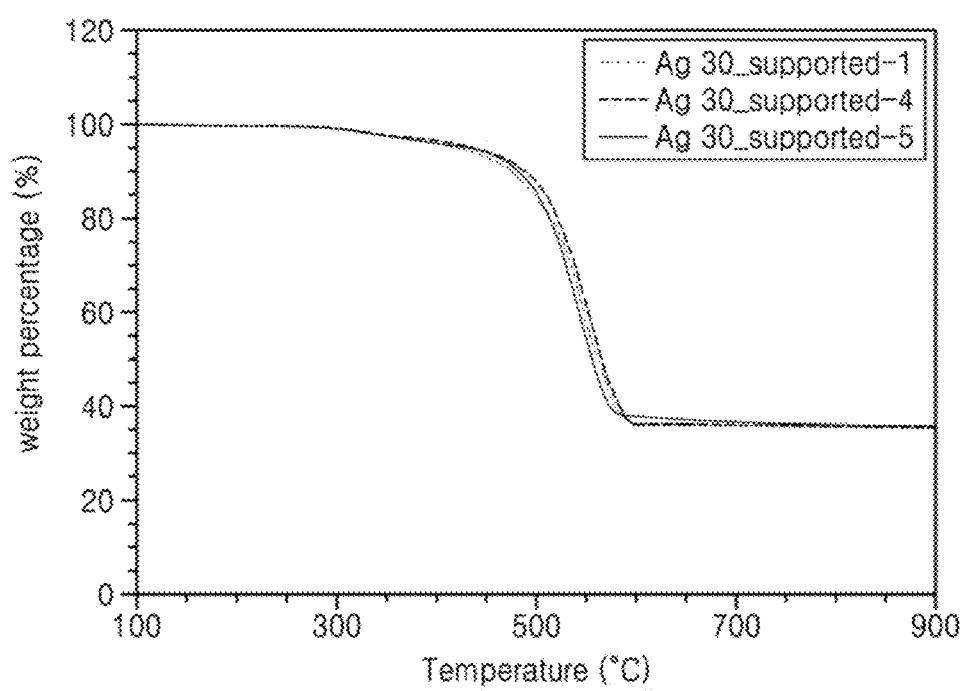
FIG. 14 illustrates the results of thermogravimetric analysis of a silver-carbon composite prepared according to Preparation Example 3.

As shown in FIGS. 13 and 14, it was observed in all of the silver-carbon composites of Preparation Examples 1 and 3 that uniform thermal decomposition occurred because the delta value of thermal decomposition temperature of 500° C. or higher was about 13° C. or less.

Figure 15:
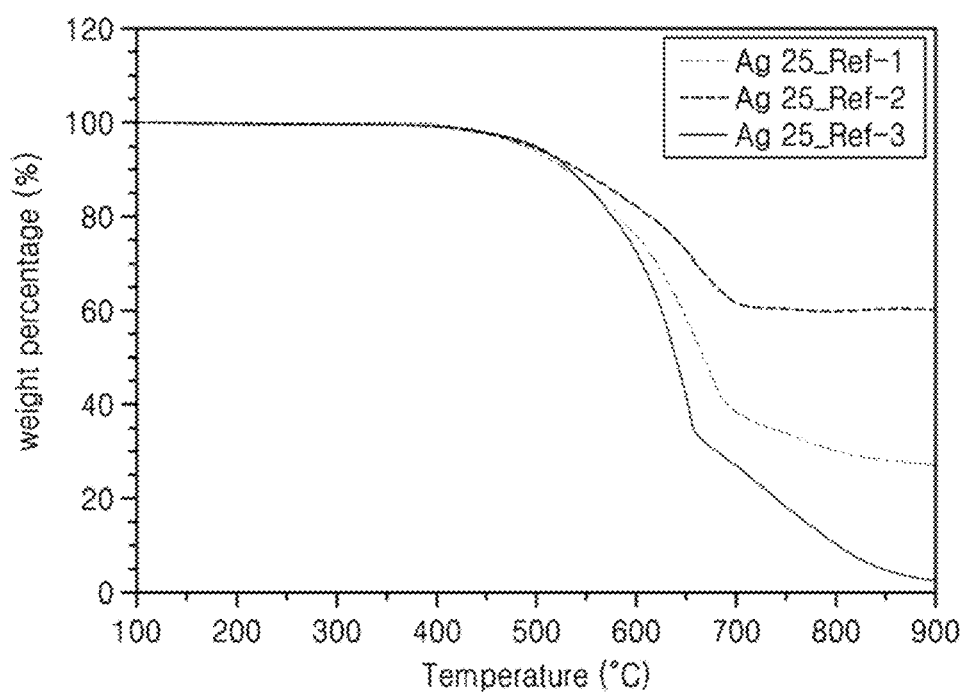
FIG. 15 illustrates the results of thermogravimetric analysis of a silver-carbon blend prepared according to Comparative Preparation Example 2.
Figure 16:
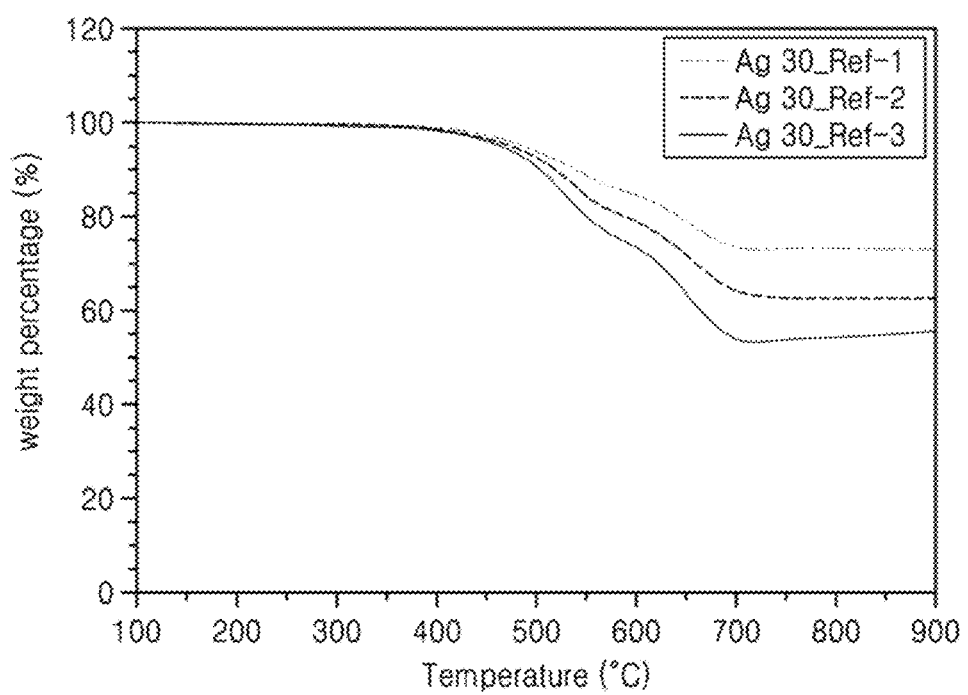
FIG. 16 illustrates the results of thermogravimetric analysis of a silver-carbon blend prepared according to Comparative Preparation Example 3.

In contrast, as shown in FIGS. 15 and 16, it was observed in each of the silver-carbon blends of Comparative Preparation Examples 2 and 3 that non-uniform thermal decomposition occurred because the delta value of thermal decomposition temperature of 500° C. or higher was about 130° C. or more, and the variation in weight in a similar temperature range was large.

The results of changing the thermogravimetric analysis results of the silver-carbon composites prepared according to Preparation Examples 1, 3 and 4 and the silver-carbon blends prepared according to Comparative Preparation Examples 2 and 3 into numerical values are shown in Table 1 below. In the numerical value change of the thermogravimetric analysis results, as shown in FIG. 17, a straight line connecting points of respective weight loss percentages (%) at the thermal decomposition temperature of 500° C. and final temperature is expressed by a linear equation represented by Equation 1 below, and the difference between slope (ΔA) and the difference between y-intercept (ΔB) are shown in Table 1 below.

$$Y = -AX + B \qquad \text{<Equation 1>}$$

In Equation 1, X is a thermal decomposition temperature, Y is a weight loss rate, A is a slope, and B is a y-intercept.

TABLE 1

|  | ΔA | ΔB |
| --- | --- | --- |
| Preparation Example 1 | 0.013 | 9.2 |
| Preparation Example 3 | 0.058 | 26.45 |

TABLE 1-continued

|  | ΔA | ΔB |
|---|---|---|
| Preparation Example 4 | 0.052 | 25.97 |
| Comparative Preparation Example 2 | 0.204 | 101.88 |
| Comparative Preparation Example 3 | 0.077 | 34.46 |

As shown in Table 1, it may be seen that, in the silver-carbon composites of Preparation Examples 1, 3, and 4, within a range of 500° C. or more, ΔA was 0.06 or less, and ΔB was 30 or less. In contrast, the measurement of the silver-carbon blends of Comparative Preparation Examples 2 and 3 is possible, but the analysis reliability thereof was low because the deviation according to the metal content was too large.

Further, thermogravimetric analysis was performed on the anode layers prepared in Examples 1 and 4 and the anode layers prepared in Comparative Examples 1, 2 and 5, and the results obtained by converting the results thereof into numerical values are shown in Table 2 below. As described above, in the numeral value change of the thermogravimetric analysis results, Equation 2 was used according to the method shown in FIG. 17.

TABLE 2

|  | ΔA' | ΔB' |
|---|---|---|
| Example 1 | 0.048 | 24.17 |
| Example 4 | 0.064 | 32.00 |
| Comparative Example 1 | 0.208 | 104.00 |
| Comparative Example 2 | 0.097 | 39.79 |
| Comparative Example 5 | 0.218 | 131.23 |

As shown in Table 2, it may be seen that, in the anode layers prepared using the metal-carbon composite of the Examples, ΔA' was 0.07 or less, and ΔB' was 50 or less.

EVALUATION EXAMPLE 6

Charge-Discharge Test

The charge-discharge characteristics of the all-solid secondary batteries manufactured in Example 1 and Comparative Examples 1, 2, and 6 were evaluated by the following charge-discharge test. The charge-discharge test was performed after putting the all-solid secondary battery into a thermostat bath at 60° C.

The battery was charged for about 10 hours with a constant current of 0.1 C until the battery voltage was 4.25 V, and then the battery was discharged for about 10 hours with a constant current of 0.05 C until the battery voltage was 2.5 V (first cycle).

Subsequently, the battery was charged for about 10 hours with a constant current of 0.1 C until the battery voltage was 4.25 V, and then the battery was discharged for about 3 hours with a constant current of 0.33 C until the battery voltage was 2.5 V (second cycle).

Thereafter, the battery was charged for about 10 hours with a constant current of 0.1 C until the battery voltage was 4.25 V. Subsequently, the battery was discharged for about 2 hours with a constant current of 0.5 C until the battery voltage was 2.5 V (third cycle).

Thereafter, the battery was charged for about 10 hours with a constant current of 0.1 C until the battery voltage was 4.25 V. Subsequently, the battery was discharged for about 1 hour with a constant current of 1 C until the battery voltage was 2.5 V (fourth cycle).

Thereafter, the battery was charged for about 3 hours with a constant current of 0.33 C until the battery voltage was 4.25 V. Subsequently, the battery was discharged for about 3 hours with a constant current of 0.33 C until the battery voltage was 2.5 V (fifth cycle).

These cycles were repeated a total of 175 times to evaluate the capacity change and capacity retention rate of the battery according to the number of cycles, respectively.

The initial charge-discharge efficiency of the battery were evaluated by Equation 3, the high-rate characteristics thereof were calculated according to Equation 4 below, and the capacity retention rate (lifetime) characteristics thereof were evaluated according to Equation 5 below.

Initial charge-discharge efficiency (%)=(discharge capacity of 1st cycle/charge capacity of 1st cycle)×100   <Equation 3>

High rate characteristics (%)=(discharge capacity at 1.0C)/(discharge capacity at 0.33C)×100   <Equation 4>

Capacity retention rate (%)=(discharge capacity after each cycle/discharge capacity of 1st cycle)×100   <Equation 5>

Figure 18:
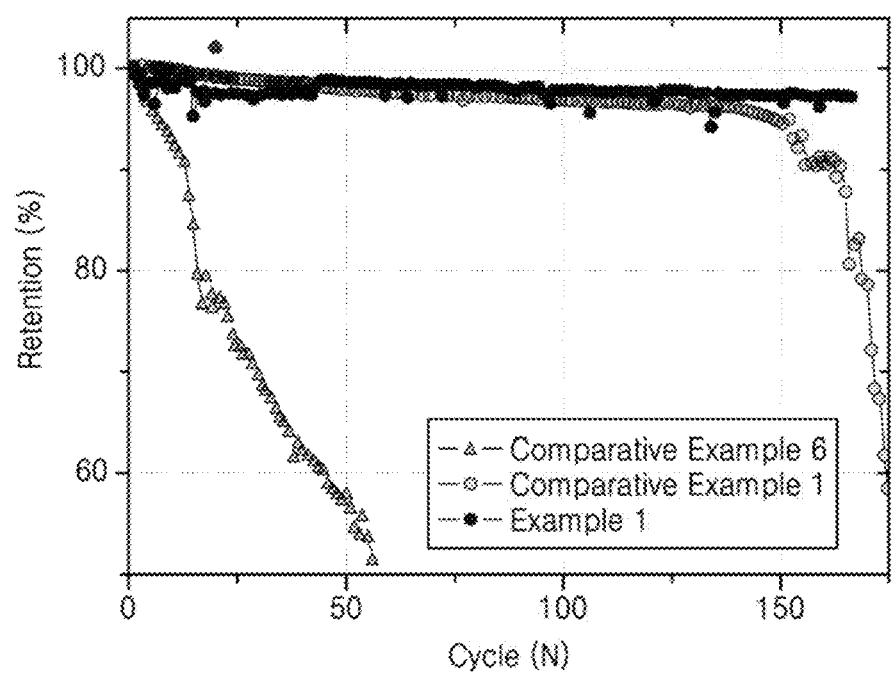
FIG. 18 is a graph illustrating a change in capacity retention ratio of all-solid secondary batteries manufactured according to Example 1 and Comparative Examples 1 and 6.

Some of the capacity retention rate characteristics are shown in FIG. 18. FIG. 18 is a graph showing a change in capacity retention rate of all-solid secondary batteries manufactured according to Example 1 and Comparative Examples 1 and 6.

As shown in FIG. 18, it may be seen that the silver-carbon blend had significantly lower lifespan characteristics in combination with an organic binder (refer to Comparative Example 6). When the silver-carbon blend was combined with an aqueous binder, it may be seen that the lifespan characteristics thereof were improved, but a capacity drop occurred during the 150 or more charge/discharge cycles (refer to Comparative Example 1). In contrast, it may be seen that, in the case of the combination of the silver-carbon composite and the aqueous binder, excellent lifespan characteristics were maintained without a capacity drop even after 150 or more charge/discharge cycles (refer to Example 1).

Further, it was evaluated whether a short circuit occurred during the charging and discharging process, and the results thereof are shown in Table 3 below. When a short circuit occurred, it was indicated as "short". The number of cycles in which the short circuit occurred was described.

TABLE 3

| Class. | Short during operation | Initial charge-discharge efficiency | High-rate characteristics (%) (1.0C/0.33C) | Capacity retention rate (%) (@50cycle) |
|---|---|---|---|---|
| Example 1 | no | 89.1 | 92.5 | 98.6 |
| Comparative Example 1 | short (@150 cycles) | 89.8 | 92.7 | 97.6 |

TABLE 3-continued

| Class. | Short during operation | Initial charge-discharge efficiency | High-rate characteristics (%) (1.0C/0.33C) | Capacity retention rate (%) (@50cycle) |
|---|---|---|---|---|
| Comparative Example 2 | no | 89.3 | 92.7 | 97.7 |

As shown in Table 3, in the all-solid secondary battery of Example 1, a short circuit did not occur even after repeatedly performing 60 cycles after manufacturing, and excellent high-rate characteristics and lifetime characteristics were exhibited.

In contrast, in the all-solid battery of Comparative Example 1, a short circuit occurred, and in the all-solid battery of Comparative Example 2, a short circuit did not occur, but it was found that this all-solid battery had to have an Ag content five times that of the all-solid battery of Example 1 to exhibit the same level of physical properties.

EVALUATION EXAMPLE 7

Rate Capability Test

The rate capability of the all-solid-state secondary batteries manufactured in Example 1 and Comparative Example 1 during charging-discharging were evaluated as follows. The rate capability test was performed after putting the all-solid secondary battery into a thermostat bath at 60° C.

After the battery was charged with a constant current of 0.1 C until a voltage reached 4.25 V, when the current is lowered to 0.05 C with the voltage maintained at 4.25 V, charging ends, and discharging starts. The battery was discharged with a constant current of 0.1 C until the voltage reached 2.5 V (first cycle).

Subsequently, after the battery was charged with a constant current of 0.1 C until a voltage reached 4.25 V, when the current is lowered to 0.05 C with the voltage maintained at 4.25 V, charging ends, and discharging starts. The battery was discharged with a constant current of 0.33 C until the voltage reached 2.5 V (second cycle).

Subsequently, after the battery was charged with a constant current of 0.1 C until a voltage reached 4.25 V, when the current is lowered to 0.05 C with the voltage maintained at 4.25 V, charging ends, and discharging starts. The battery was discharged with a constant current of 1.0 C until the voltage reached 2.5 V (third cycle).

Figure 19:
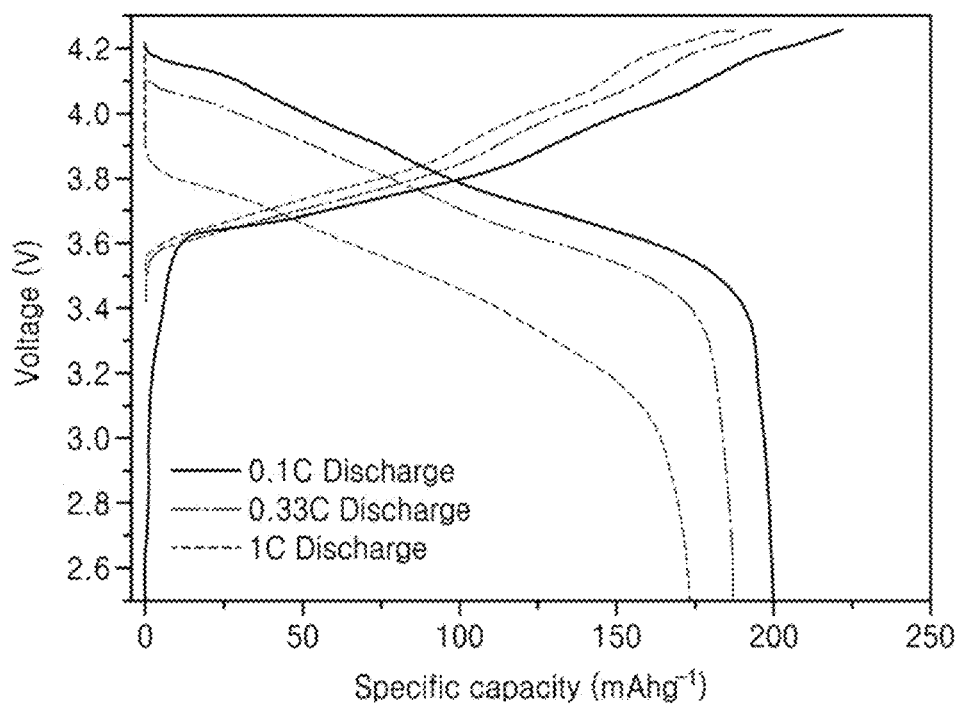
FIG. 19 is a graph illustrating the results of discharge rate characteristics of an all-solid secondary battery according to Example 1.
Figure 20:
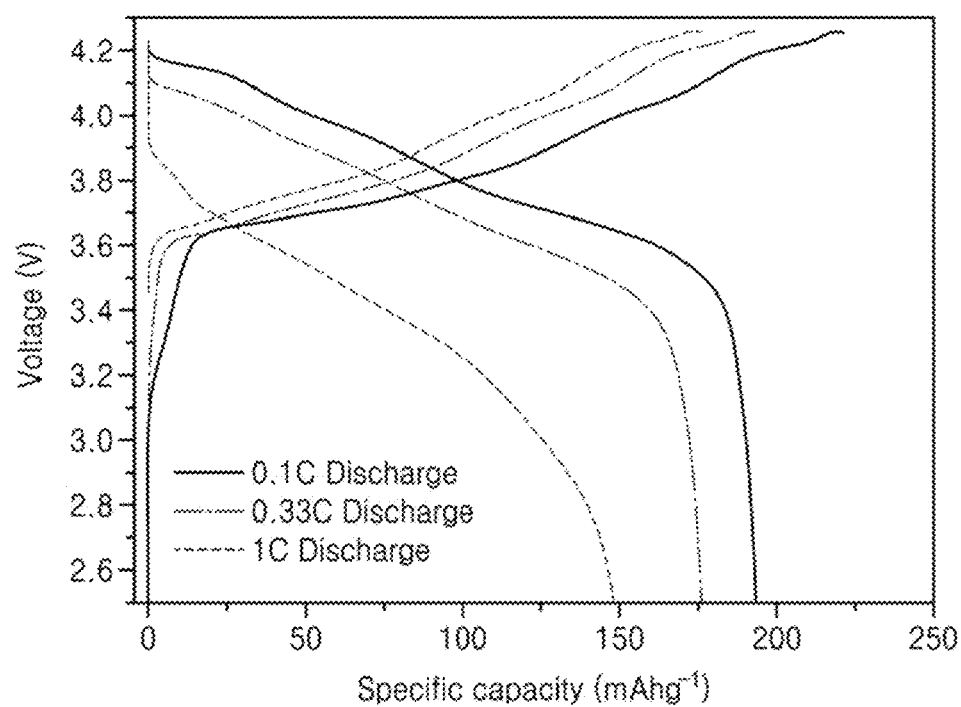
FIG. 20 is a graph illustrating the results of discharge rate characteristics of an all-solid secondary battery according to Comparative Example 1.

The results of rate capability of the all-solid secondary batteries manufactured in Example 1 and Comparative Example 1 are shown in FIGS. 19 and 20, respectively.

As shown in FIGS. 19 and 20, it was found that the all-solid secondary battery of Example 1 using the anode layer containing the metal-carbon composite exhibited superior rate capability compared to the all-solid-state secondary battery of Comparative Example 1 using the anode layer containing the metal-carbon blend because the resistance of lithium ions in the all-solid secondary battery of Example 1 was reduced.

By way of summation and review, some lithium-ion batteries use an electrolyte solution including a flammable organic solvent, and there is a possibility of overheating and fire when a short circuit occurs. In this regard, all-solid batteries using a solid electrolyte instead of an electrolyte solution have been considered.

All-solid batteries do not use flammable organic solvents, and even if a short circuit were to occur, the possibility of fires or explosions may be greatly reduced. Accordingly, safety of such all-solid secondary batteries may greatly increase as compared with that of lithium-ion batteries using a (e.g., liquid) electrolyte solution.

An anode slurry for all-solid secondary batteries may be made of metal particles and carbon material, and in this case, uniform dispersion of the metal particles may be helpful in order to uniformly distribute a current.

The anode material for all-solid secondary batteries according to an embodiment may include a metal-carbon composite in which metal particles are uniformly dispersed in a carbon material, thereby preventing the aggregation of metal particles. The anode layer formed using the anode material may make a current distribution in the anode layer uniform.

One or more embodiments may provide an anode material capable of improving the dispersion of a metal in an anode layer in an all-solid secondary battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An anode material for all-solid secondary batteries, the anode material comprising a metal-carbon composite, wherein:
  the metal-carbon composite includes:
    a carbon material; and
    metal particles,
  the carbon material includes a carbonyl group, an ether group, a carboxylate group, an anhydride group, an aldehyde group, a lactone group, a phenol group, or a quinone group,
  the metal particles are dispersed in the carbon material, between particles of the carbon material, on a surface of the carbon material, or in two or more locations thereof,
  the metal particles form a complex with the carbon material through ionic or covalent bonding,
  the metal-carbon composite has a metal-oxygen bond-related peak in a Raman spectrum,
  in the Raman spectrum, the metal-oxygen bond-related peak exists at a Raman shift of about 200 $cm^{-1}$, about 470 $cm^{-1}$, or about 990 $cm^{-1}$, wherein the Raman spectrum is measured using a UV laser having a wavelength of about 514~516 nm, and
  in a case of performing thermogravimetric analyses on randomly selected multiple sites of the same sample, in each thermogravimetric analysis of the metal-carbon composite, when a straight line connecting points of respective weight percentages (%) at a thermal decomposition temperature of 500° C. and a final temperature at which no further weight loss occurs is expressed by a linear equation represented by Equation 1 below, $$Y=-AX+B \qquad \text{<Equation 1>}$$

in Equation 1, X is a thermal decomposition temperature in° C., Y is a weight loss rate, $-A$ is a slope, and B is a y-intercept, and ΔA, which is a difference between values of A in each thermogravimetric analysis, is about 0.06 or less, and ΔB, which is a difference between values of B in each thermogravimetric analysis, is about 30 or less.

2. The anode material as claimed in claim 1, wherein, in X-ray diffraction (XRD) analysis obtained using CuKα rays, the metal-carbon composite has a 2theta value of at least one of about 35° to about 40°, about 40° to about 45°, about 60° to about 68°, about 75° to about 80°, and about 80° to about 85° in crystal peaks.

3. The anode material as claimed in claim 1, wherein, in each thermogravimetric analysis of the metal-carbon composite, a difference between values of the final temperature is about 30° C. or lower.

4. The anode material as claimed in claim 1, wherein the metal particles include silver, zinc, silicon, tin, or a combination thereof.

5. The anode material as claimed in claim 1, wherein the carbon material includes amorphous carbon, crystalline carbon, or a mixture thereof.

6. The anode material as claimed in claim 5, wherein
the amorphous carbon includes carbon black, vapor grown carbon fiber (VGCF), acetylene black (AB), active furnace black, or a combination thereof, and
the crystalline carbon includes natural graphite, artificial graphite, carbon nanotubes (CNT), graphene, or a combination thereof.

7. The anode material as claimed in claim 1, wherein the metal-carbon composite includes:
about 3 wt % to about 40 wt % of the metal particles, and 60 wt % to about 97 wt % of the carbon material, all wt % being based on a total weight of the carbon material and the metal particles.

8. An anode composition for all-solid secondary batteries, the anode composition comprising:
the anode material as claimed in claim 1; and
an aqueous binder.

9. An anode layer for all-solid secondary batteries, the anode layer comprising:
an anode current collector; and
a first anode active material layer on the anode current collector,
wherein the first anode active material layer includes the anode material as claimed in claim 1.

10. The anode layer as claimed in claim 9, wherein:
in a case of performing thermogravimetric analyses on randomly selected multiple sites of one anode layer, in each thermogravimetric analysis of the anode layer, when a straight line connecting points of respective weight percentages (%) at a thermal decomposition temperature of 500° C. and a final temperature at which no further weight loss occurs is expressed by a linear equation represented by Equation 2 below, $$Y=-A'X+B' \qquad \text{<Equation 2>}$$

in Equation 2 above, X is a thermal decomposition temperature in° C., Y is a weight loss rate, $-A'$ is a slope, and B' is a y-intercept, and ΔA', which is a difference between values of A' in each thermogravimetric analysis, is about 0.07 or less, and ΔB', which is a difference between values of B' in each thermogravimetric analysis, is about 50 or less.

11. The anode layer as claimed in claim 9, further comprising a metal or metalloid thin film between the anode current collector and the first anode active material layer.

12. The anode layer as claimed in claim 11, wherein
the metal or metalloid thin film includes gold (Au), silver (Ag), magnesium (Mg), zinc (Zn), silicon (Si), tin (Sn), platinum (Pt), palladium (Pd), aluminum (Al), bismuth (Bi), or a combination thereof, and
the metal or metalloid thin film has a thickness of about 1 nm to about 800 nm.

13. The anode layer as claimed in claim 10, further comprising a second anode active material layer, wherein the second anode active material layer includes lithium or a lithium alloy, and the lithium alloy includes a metal element, a metalloid element, or a combination thereof, the metal element or metalloid element being capable of forming an alloy with lithium.

14. An all-solid secondary battery, comprising:
a cathode layer;
an anode layer; and
a solid electrolyte layer between the cathode layer and the anode layer,
wherein the anode layer is the anode layer as claimed in claim 13.

15. The all-solid secondary battery as claimed in claim 14, wherein:
the anode layer further includes a second anode active material layer on the first anode active material layer or between the anode current collector and the first anode active material layer, and
the second anode active material layer includes lithium or a lithium alloy.

16. The all-solid secondary battery as claimed in claim 14, wherein the solid electrolyte layer includes an argyrodite-type sulfide solid electrolyte.

17. The all-solid secondary battery as claimed in claim 16, wherein the argyrodite-type sulfide solid electrolyte includes $Li_6PS_5Cl$, $Li_6PS_5Br$, or $Li_6PS_5I$.

18. The anode material as claimed in claim 1, wherein the metal particles are bonded to the carbon material through carboxylate groups.

* * * * *